United States Patent
Hatano

(10) Patent No.: US 9,070,051 B2
(45) Date of Patent: Jun. 30, 2015

(54) IMAGE FORMING APPARATUS AND CONTROL METHOD FOR ENABLING PROPER EXECUTION OF SETTING AND POWER-OFF OF THE IMAGE FORMING APPARATUS

(71) Applicant: CANON KABUSHIKI KAISHA, Tokyo (JP)

(72) Inventor: Manami Hatano, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 24 days.

(21) Appl. No.: 13/762,116

(22) Filed: Feb. 7, 2013

(65) Prior Publication Data

US 2013/0215450 A1    Aug. 22, 2013

(30) Foreign Application Priority Data

Feb. 16, 2012 (JP) .................................. 2012-031392

(51) Int. Cl.
- *G06F 3/12* (2006.01)
- *G06K 15/02* (2006.01)
- *G06K 15/00* (2006.01)
- *H04L 12/24* (2006.01)

(52) U.S. Cl.
CPC ............ *G06K 15/02* (2013.01); *G06K 15/4055* (2013.01); *G06F 3/1203* (2013.01); *G06F 3/1229* (2013.01); *G06F 3/1285* (2013.01); *H04L 41/0833* (2013.01)

(58) Field of Classification Search
None
See application file for complete search history.

(56) References Cited

U.S. PATENT DOCUMENTS

| | | | | |
|---|---|---|---|---|
| 2004/0128368 A1* | 7/2004 | Sakai | ............... | 709/220 |
| 2004/0148379 A1* | 7/2004 | Ogura | ............... | 709/223 |
| 2004/0213588 A1* | 10/2004 | Kawaura | ............. | 399/8 |
| 2005/0100353 A1* | 5/2005 | Kawaura | ............. | 399/8 |
| 2007/0236734 A1* | 10/2007 | Okamoto | ............. | 358/1.16 |
| 2008/0002236 A1* | 1/2008 | Inaba | ............... | 358/471 |
| 2008/0155286 A1* | 6/2008 | Hirai | ............... | 713/320 |
| 2010/0315670 A1* | 12/2010 | Kojima | ............. | 358/1.15 |
| 2011/0321028 A1* | 12/2011 | Evans et al. | ......... | 717/170 |
| 2012/0278643 A1* | 11/2012 | Nishikawa | ......... | 713/323 |
| 2012/0300250 A1* | 11/2012 | Ono et al. | ........... | 358/1.15 |
| 2014/0025974 A1* | 1/2014 | Suwabe | ............. | 713/323 |
| 2014/0047425 A1* | 2/2014 | Thapar et al. | ........ | 717/168 |

FOREIGN PATENT DOCUMENTS

JP      2010-004335 A      1/2010

* cited by examiner

*Primary Examiner* — Nicholas Pachol
(74) *Attorney, Agent, or Firm* — Canon U.S.A., Inc. IP Division

(57) ABSTRACT

An image forming apparatus includes a first designation unit configured to designate a power-off task of shutting down the image forming apparatus in a designated period, a second designation unit configured to designate a setting task of executing a setting process for setting a setting item of the image forming apparatus in a designated period and a restart process for restarting the image forming apparatus after the setting process, and a task control unit configured to control execution of the designated power-off task and the designated setting task. The task control unit is configured to, if the power-off task is designated, perform control to change processing of the power-off task and the setting task according to which of the processes of the setting task a period that an end of the designated period of the power-off task reaches corresponds to.

13 Claims, 36 Drawing Sheets

FIG.7

| 701 | 702 | 703 | 704 | 705 | 706 | 707 | 708 |
|---|---|---|---|---|---|---|---|
| IMMEDIATE FLAG | START TIME | STORAGE DESTINATION TYPE | FILE PATH | USER NAME | PASSWORD | SETTING PROCESSING PRE-START JOB WAIT MAXIMUM WAITING TIME | PRE-RESTART JOB WAIT MAXIMUM WAITING TIME |

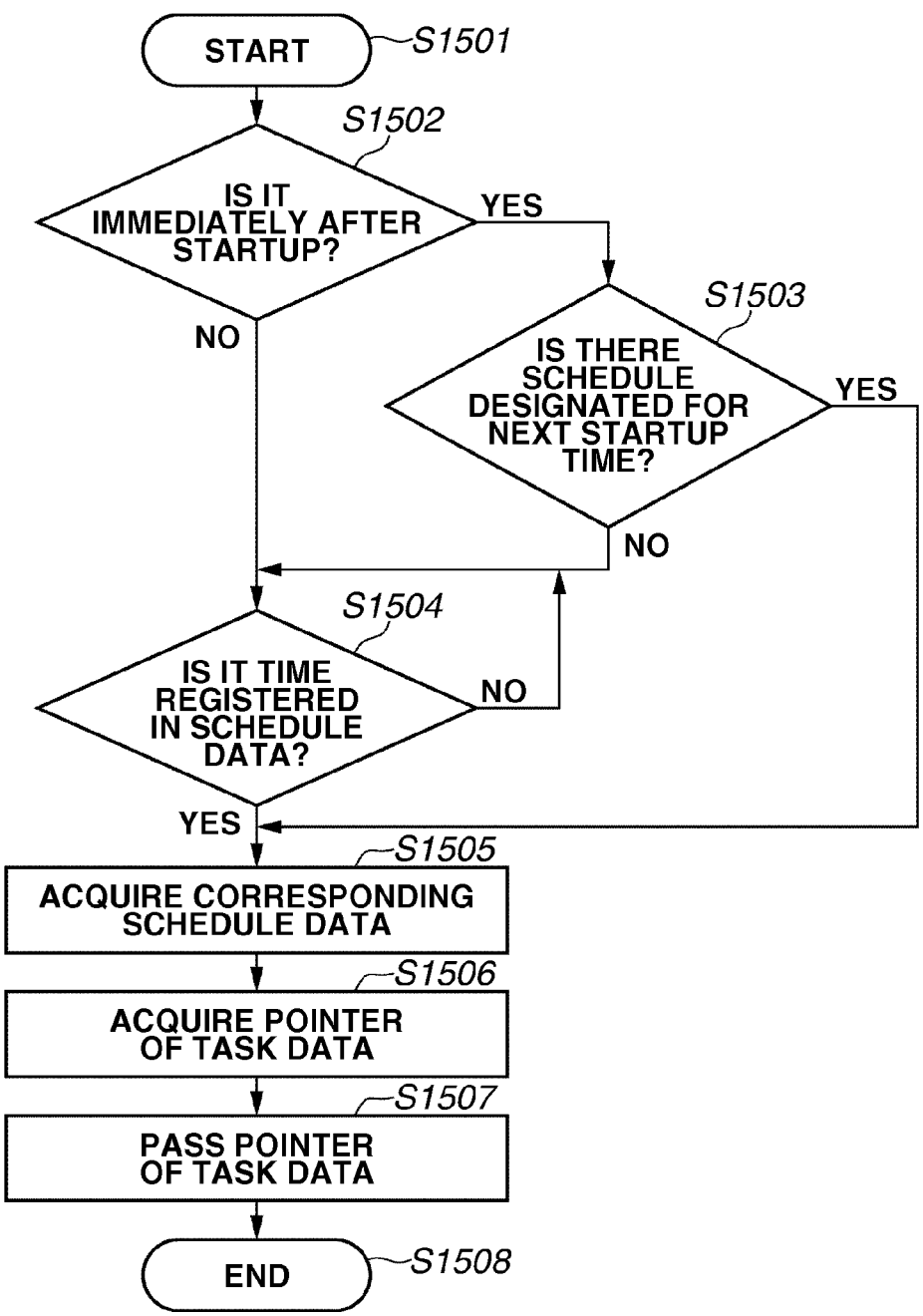

FIG.27

EDIT DEVICE SETTING TASK

2701

[801] UPDATE  [802] IMMEDIATE EXECUTION  [803] CANCEL

POWER-OFF TASK ALREADY EXISTS. DEVICE SETTING TASK CANNOT BE GENERATED IF IT FORCES EXECUTION OF DEVICE SETTING BY YYYY/MM/DD hh:mm WITH WAITING TIME FOR END OF JOB INCLUDED. INPUT TIME AND WAITING TIME NOT INTERFERING WITH RESTRICTION, OR CANCEL AND RE-GENERATE POWER-OFF TASK.

● IMPORT FILE SETTING

STORAGE DESTINATION OF IMPORT FILE: [Xxxdows SHARED FOLDER ▼] 811

FILE PATH: [____] 812

USER NAME: [____] 813

PASSWORD: [____] 814

● OPERATION WHEN DEVICE INCLUDES JOB IN OPERATION

WAITING TIME UNTIL END OF JOB: [____] MINUTES (0~120) 821

WAITING TIME FOR RESTART AFTER COMPLETION OF PROCESSING: [____] MINUTES (0~30) 822

● SCHEDULE SETTING

831 ☐ SET EXECUTION SCHEDULE  832

EXECUTION DATE: [____] (YYYY/MM/DD)

EXECUTION START TIME: [____] (hh:mm)

833

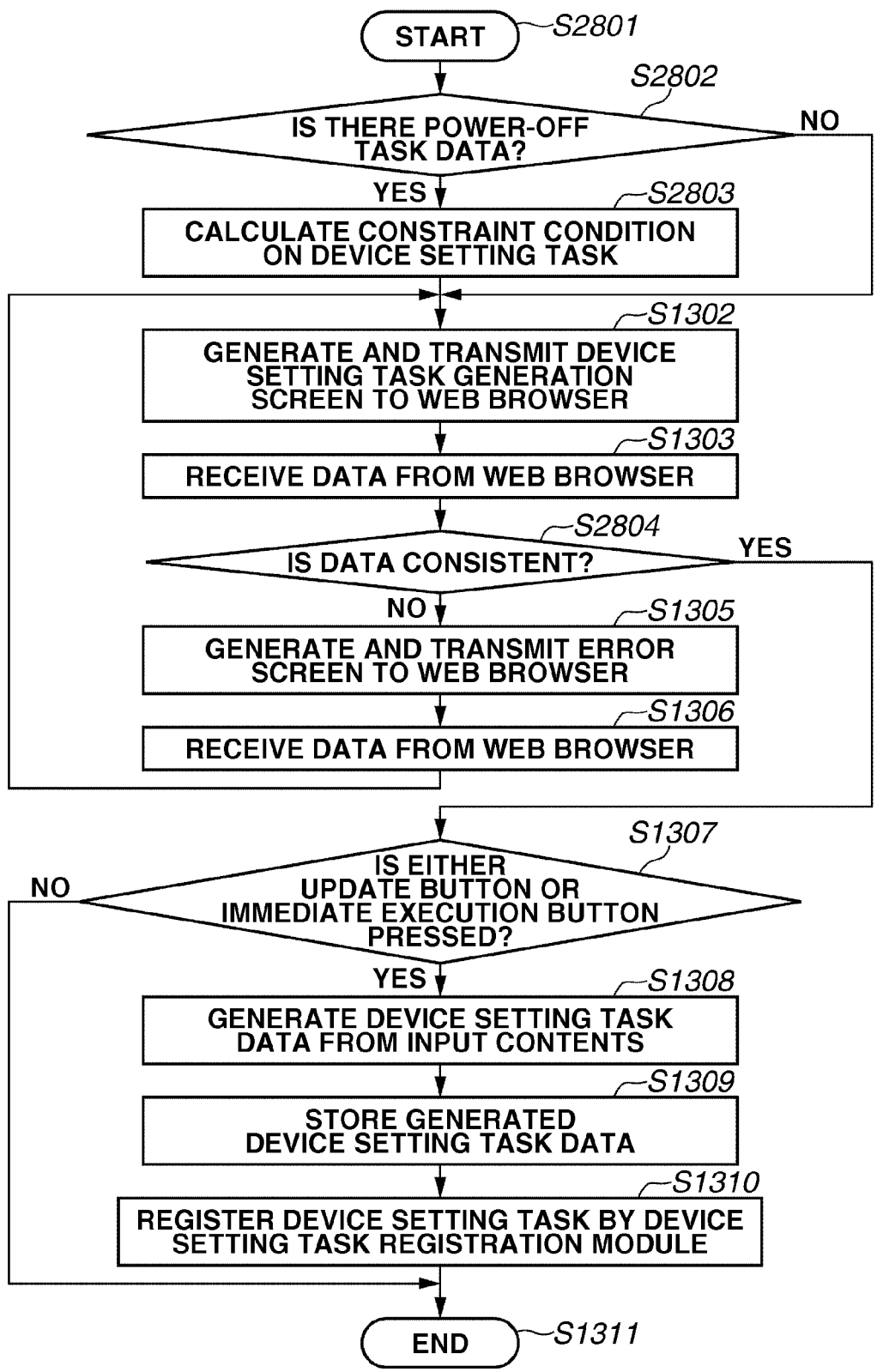

IMAGE FORMING APPARATUS AND CONTROL METHOD FOR ENABLING PROPER EXECUTION OF SETTING AND POWER-OFF OF THE IMAGE FORMING APPARATUS

BACKGROUND OF THE INVENTION

1. Field of the Invention

The present invention relates to an image forming apparatus and a method for controlling the image forming apparatus.

2. Description of the Related Art

Conventional management systems of a network device (hereinafter, referred to as a device) such as an image forming apparatus include ones having a function of powering off the device, a function of executing device setting, and a function of subsequently restarting the device to apply the change in setting.

Some management systems are capable of immediately executing such functions according to an instruction from an administrator and/or automatically executing the functions according to a schedule setting.

The functions may be scheduled to be automatically executed in an overlapping manner. Some management systems have a function of performing at least either one of the functions at a shifted time to prevent a power-off from being executed during device setting (See Japanese Patent Application Laid-Open No. 2010-004335).

With such conventional network device management systems, a power-off can be executed during device setting if the administrator gives an instruction to immediately execute the functions. In such a case, the conventional network device management systems have not been able to prevent the power-off from interfering with proper changing of the device setting.

The conventional network device management systems have also not been able to properly execute a power-off, whether instructed to be immediately executed or automatically executed according to a schedule setting, if the time to execute the power-off passes during a restart.

In such a case, it has not been possible to prevent the device from being kept powered on at a time when the device is supposed to be powered off. Abrupt disconnection of an external power supply can cause a device failure. If the external power supply to the device is known to be disconnected at a specific time for outage or maintenance purposes in advance, it is important to power off the device by that time. According to the conventional technology, the device has often been left not powered off at the time.

SUMMARY OF THE INVENTION

The present invention is directed to a method for enabling proper execution of setting and a power-off of an image forming apparatus even if the setting, an accompanying restart, and the power-off of the image forming apparatus are instructed to be executed immediately or according to a schedule setting in an overlapping manner.

According to an aspect of the present invention, an image forming apparatus includes a first designation unit configured to designate a power-off task of shutting down the image forming apparatus in a designated period, a second designation unit configured to designate a setting task of executing a setting process for setting a setting item of the image forming apparatus in a designated period and a restart process for restarting the image forming apparatus after the setting process, and a task control unit configured to control execution of the designated power-off task and the designated setting task, wherein the task control unit is configured to, if the power-off task is designated, perform control to change processing of the power-off task and the setting task according to which of the processes of the setting task a period that an end of the designated period of the power-off task reaches corresponds to.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a diagram schematically illustrating a data configuration of device setting task data.

FIG. 15 is a flowchart illustrating an example of a procedure by which a timer notification module calls a scheduled task.

FIG. 27 is a diagram schematically illustrating a device setting task generation screen which a device setting task generation module according to a sixth exemplary embodiment displays on a web browser running on the information processing apparatus via the network by using a servlet and from which the administrator can generate a device setting task.

FIG. 28 is a flowchart illustrating an example of a procedure by which the device setting task generation module according to the sixth exemplary embodiment generates a device setting task.

DESCRIPTION OF THE EMBODIMENTS

Various exemplary embodiments, features, and aspects of the invention will be described in detail below with reference to the drawings.

Figure 1:
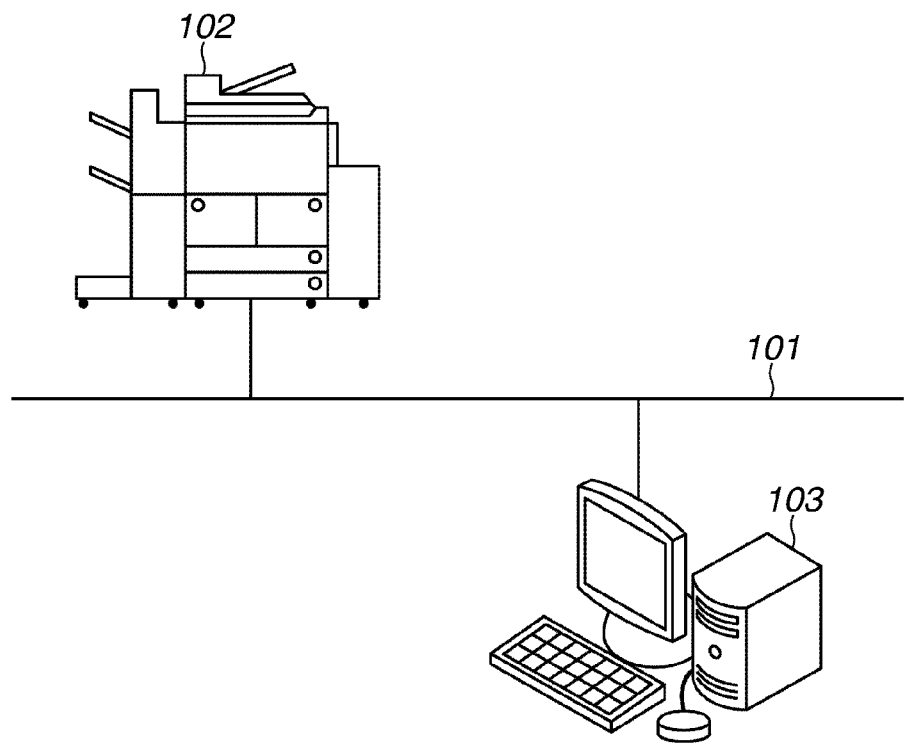
FIG. 1 is a diagram illustrating an example of a system to which an image forming apparatus according to a first exemplary embodiment can be applied.

FIG. 1 is a diagram illustrating an example of a system to which an image forming apparatus according to a first exemplary embodiment can be applied.

In FIG. 1, an image forming apparatus (hereinafter, referred to as an MFP) 102 is connected to a network 101. An information processing apparatus 103 is also connected to the network 101.

Figure 2:
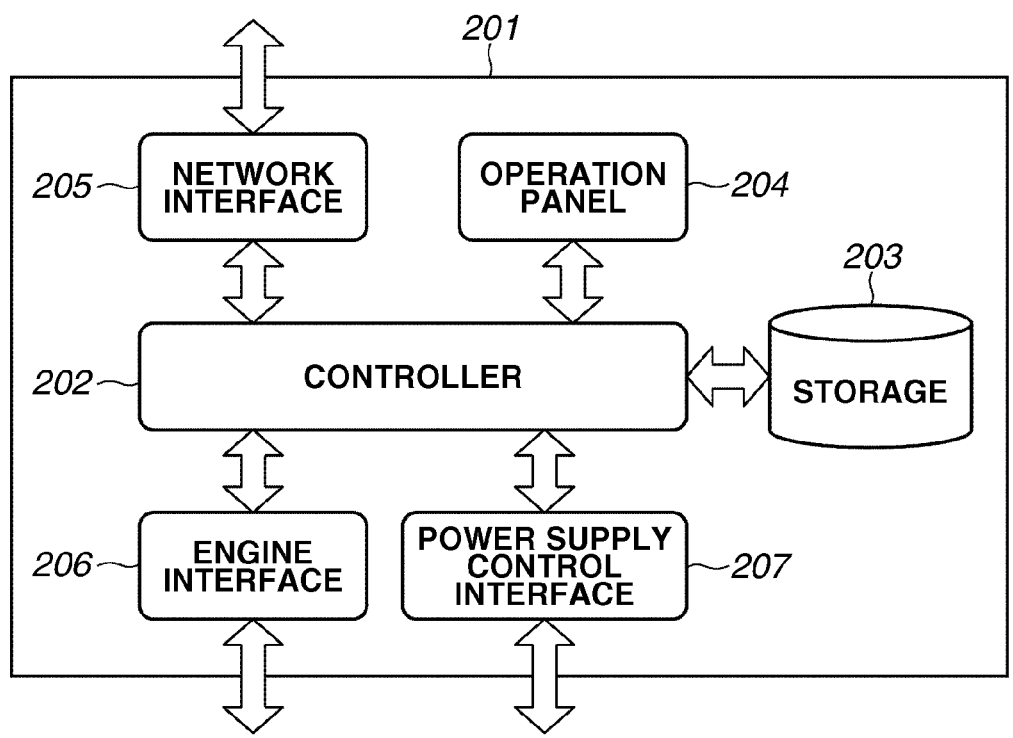
FIG. 2 is a block diagram schematically illustrating apart of a configuration of a multifunction peripheral (MFP).

FIG. 2 is a block diagram schematically illustrating a part of a configuration of the MFP 102.

In FIG. 2, the MFP 102 includes a control unit 201. A controller 202 is a main body portion of the control unit 201. The controller 202 includes a central processing unit (CPU), a read-only memory (ROM), and a random access memory (RAM), which are not illustrated. The CPU executes programs stored in the ROM to control the entire MFP 102 in a comprehensive manner.

The control unit 201 includes a storage 203 such as a hard disk drive (HDD) or a solid state drive (SSD), and an operation panel 204. The control unit 201 is connected to the network 101 via a network interface 205. An engine interface 206 is connected to an image forming engine (not illustrated) of the MFP 102. A power supply control interface 207 is connected to a power supply unit (not illustrated) of the MFP 102.

Figure 3:
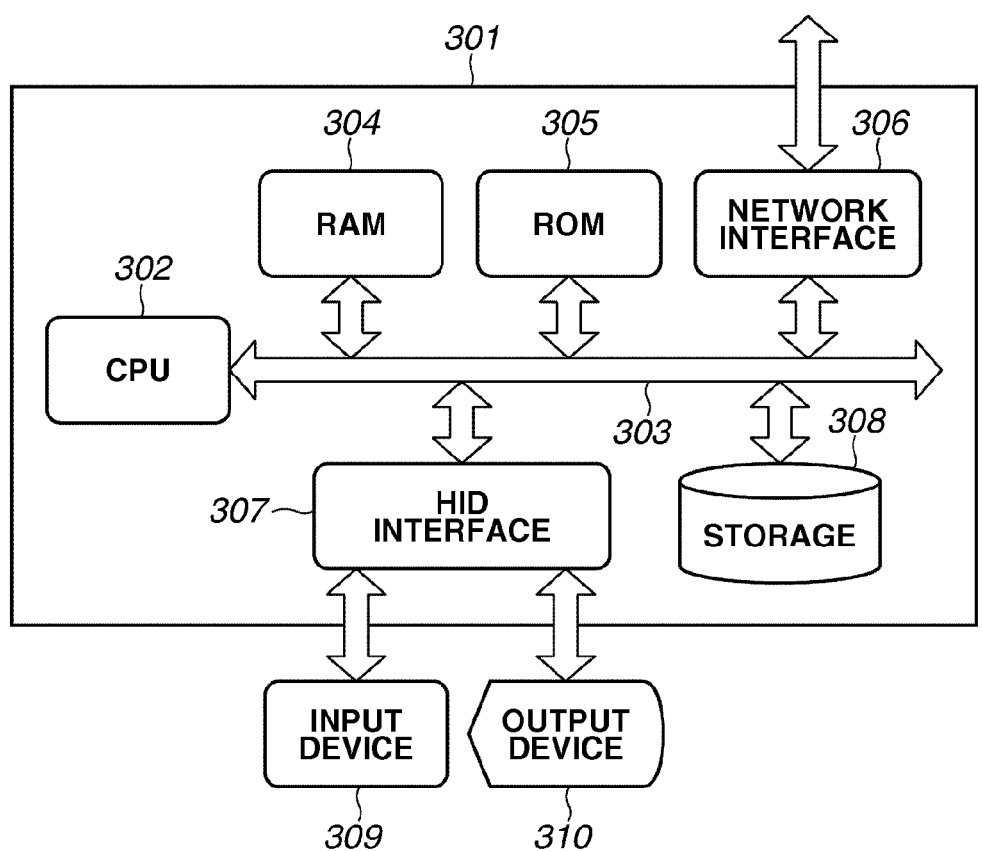
FIG. 3 is a block diagram schematically illustrating a configuration of an information processing apparatus.

FIG. 3 is a block diagram schematically illustrating a configuration of the information processing apparatus 103.

In FIG. 3, the information processing apparatus 103 includes a main body 301, which includes a CPU 302, a bus 303, and a RAM 304. The bus 303 is connected to the CPU 302.

The main body 301 also includes a ROM 305. The information processing apparatus 103 is connected to the network 101 via a network interface 306. Examples of a storage 308 include an HDD or an SSD.

The information processing apparatus 103 also includes a human interface device (hereinafter, referred to as HID) interface 307, an input device 309 such as a keyboard and a mouse, and an output device 310 such as a display and a speaker. The input device 309 and the output device 310 are connected to the HID interface 307.

Figure 4:
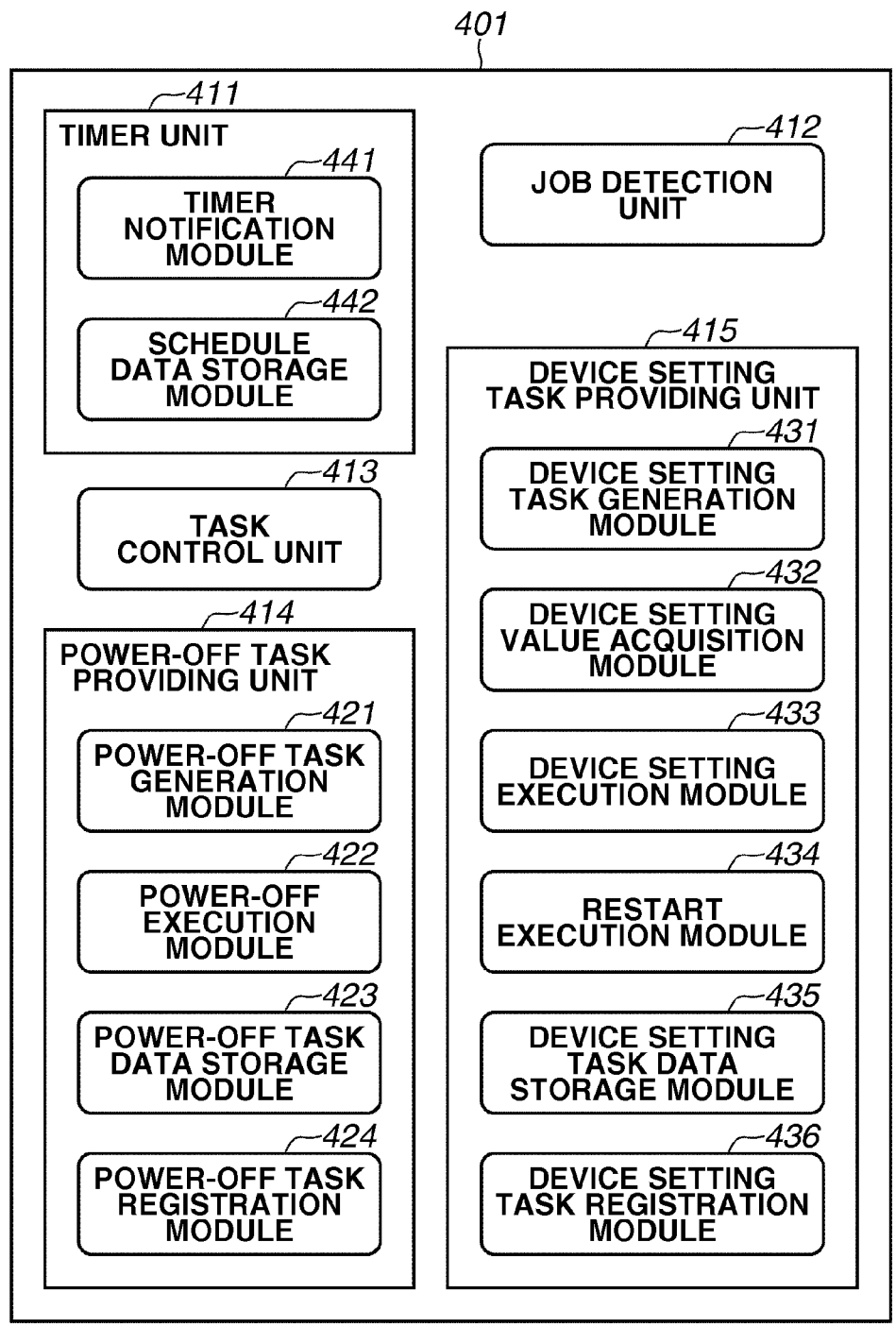
FIG. 4 is a block diagram illustrating an internal configuration of network management software of a network device management system according to the first exemplary embodiment, the network management software running on a controller of the MFP.

FIG. 4 is a block diagram illustrating an internal configuration of network management software of a network device management system according to the first exemplary embodiment. The network management software runs on the controller 202 of the MFP 102.

In FIG. 4, the entire network management software 401 corresponds to functions that the CPU inside the controller 202 implements by executing programs stored in the internal ROM.

The network management software 401 includes a timer unit 411, a job detection unit 412, a task control unit 413, a power-off task providing unit 414, and a device setting task providing unit 415.

The power-off task providing unit 414 includes a power-off task generation module 421, a power-off execution module 422, a power-off task data storage module 423, and a power-off task registration module 424. The power-off execution module 422 executes a power-off (shutdown) of the MFP 102. The modules 421 to 424 will be described in detail below.

The device setting task providing unit 415 includes a device setting task generation module 431, a device setting value acquisition module 432, a device setting execution module 433, a restart execution module 434, a device setting task data storage module 435, and a device setting task registration module 436. The modules 431 to 436 will be described in detail below.

The timer unit 411 includes a timer notification module 441 and a schedule data storage module 442. The modules 441 and 442 will be described in detail below.

Figure 5:
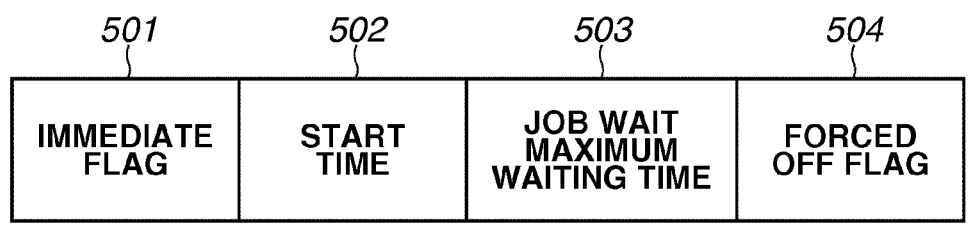
FIG. 5 is a diagram schematically illustrating a data configuration of power-off task data.

FIG. 5 is a diagram schematically illustrating a data configuration of power-off task data.

The power-off task generation module 421 generates power-off task data. The power-off task data is stored in the power-off task data storage module 423.

The configuration of the power-off task data will be described below. An immediate flag 501 determines whether to execute the power-off task immediately or according to a schedule. A start time 502 is set if the power-off task is to be executed according to a schedule. Even if the power-off task is to be immediately executed, the power-off task generation module 421 may store the current time as the start time 502 when generating the power-off task data. A job wait maximum waiting time 503 determines an upper limit of waiting time for performing a job wait before actually executing a power-off.

A forced off flag 504 determines whether to forcibly execute a power-off if a job still exists after the lapse of the job wait maximum waiting time 503. By using the forced off flag 504, the administrator can instruct whether to issue a forced execution instruction to forcibly execute the power-off task even if execution of a waited job does not end within a designated period (before the lapse of the job wait maximum waiting time 503 since the start time 502).

Figure 6:
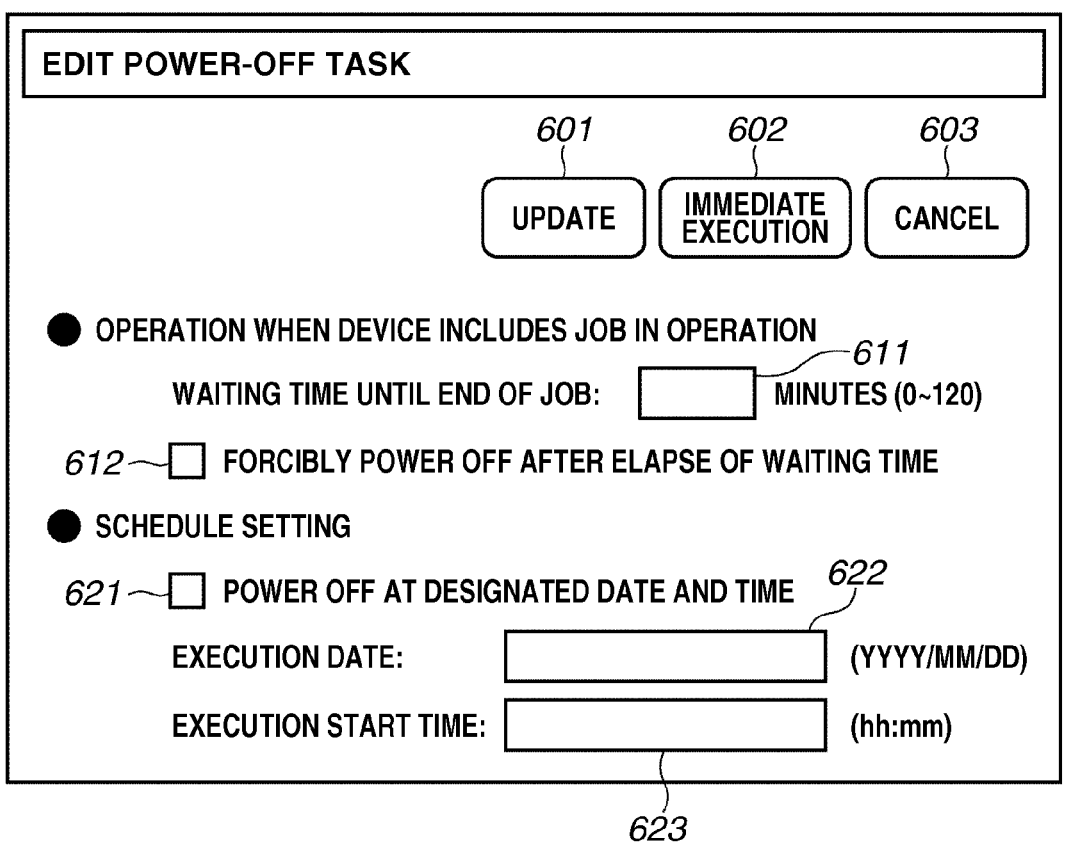
FIG. 6 is a diagram schematically illustrating a power-off task generation screen which a power-off task generation module displays on a web browser running on the information processing apparatus via a network by using a servlet and from which the administrator can generate a power-off task.

FIG. 6 is a diagram schematically illustrating a power-off task generation screen which the power-off task generation module 421 displays on a web browser running on the information processing apparatus 103 via the network 101 by using a servlet and from which the administrator can generate a power-off task.

In FIG. 6, an update button 601 is operable to update a setting or settings of a power-off task based on inputs on the screen. An immediate execution button 602 is operable to immediately execute a power-off task based on inputs on the screen. A cancel button 603 is operable to end the screen without setting a power-off task.

A job wait maximum waiting time entry field 611 is operable for the administrator to input the job wait maximum waiting time 503. A forced power-off check box 612 is operable for the administrator to designate the value of the forced off flag 504.

A schedule setting check box 621 is operable for the administrator to designate whether to execute the power-off task according to a schedule. A start time date section entry field 622 is operable for the administrator to input a date section of the start time 502 if the power-off task is to be executed according to a schedule. A start time time-section entry field 623 is operable for the administrator to input a time section of the start time 502 if the power-off task is to be executed according to a schedule.

Figure 10:
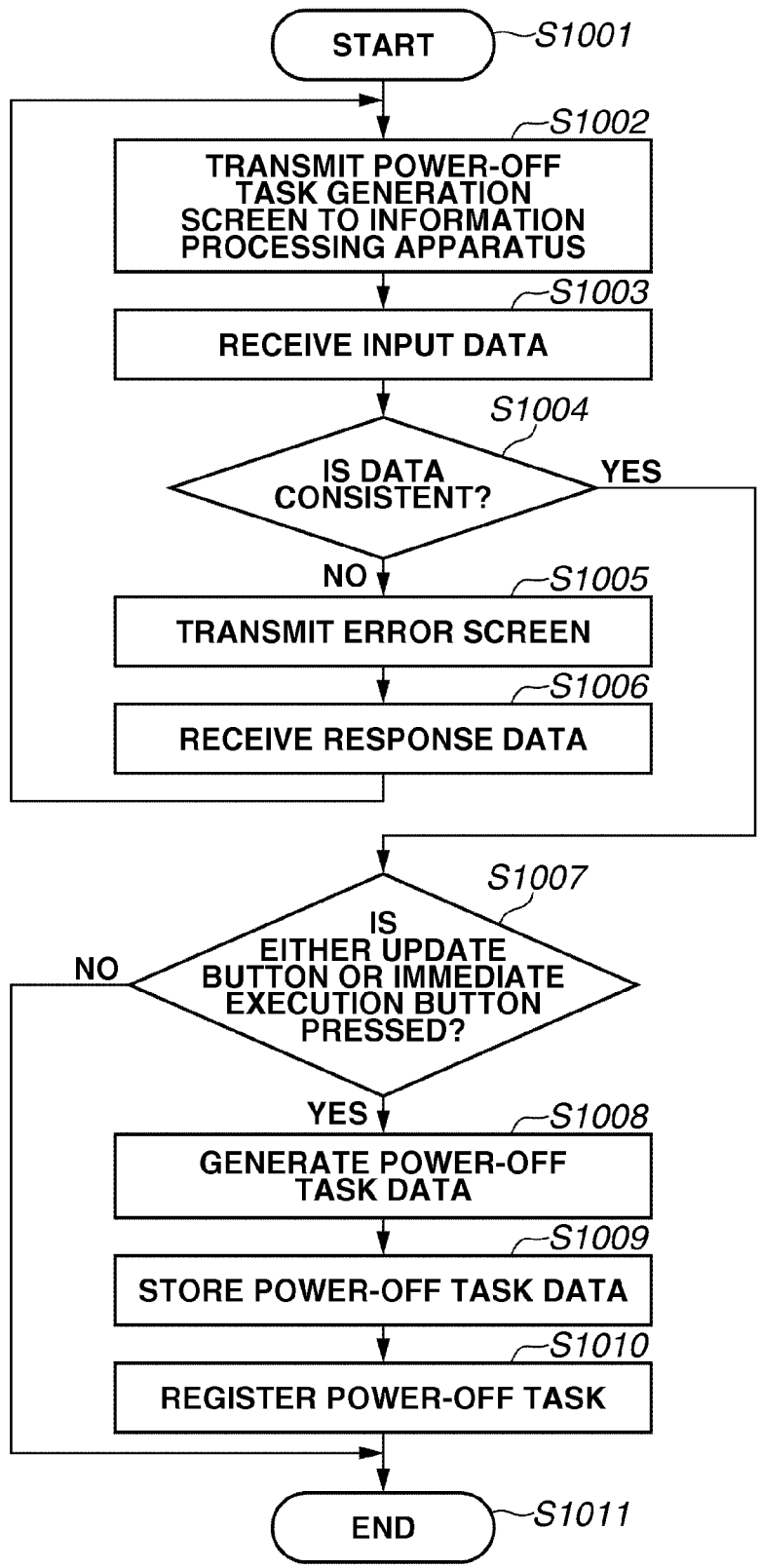
FIG. 10 is a flowchart illustrating an example of a procedure by which the power-off task generation module generates a power-off task.

Details of a procedure by which the power-off task generation module 421 generates a power-off task are illustrated in FIG. 10 to be described below.

FIG. 7 is a diagram schematically illustrating a data configuration of device setting task data.

The device setting task generation module 431 generates device setting task data. The device setting task data is stored in the device setting task data storage module 435.

In FIG. 7, an immediate flag 701 determines whether to execute the device setting task immediately or according to a schedule. A start time 702 is set if the device setting task is to be executed according to a schedule.

A storage destination type 703 indicates the type of a storage destination of a device setting value file for the device setting value acquisition module 432 to acquire. A file path 704 indicates the file path of the device setting value file for the device setting value acquisition module 704 to acquire. The device setting value file is a file containing setting items and setting values of the device to be set by the device setting task. The administrator generates the device setting value file in advance and stores the device setting value file in a storage location on the network 101, accessible from the MFP 102 (for example, Windows (registered trademark) shared file inside the information processing apparatus 103). Possible settings of the storage destination type 703 include a Windows (registered trademark) shared file and the storage 203 in the MFP 102.

A user name 705 indicates the user name of a user for the device setting value acquisition module 432 to use when accessing the device setting value file. A password 706 indicates the password of the user for the device setting value acquisition module 432 to use when accessing the device setting value file.

A setting processing pre-start job wait maximum waiting time 707 determines an upper limit of waiting time for performing a job wait before starting processing for importing device setting values in the device setting task. A pre-restart job wait maximum waiting time 708 determines an upper limit of waiting time for performing a job wait before executing a restart after the processing for importing the device setting values in the device setting task is completed.

Figure 8:
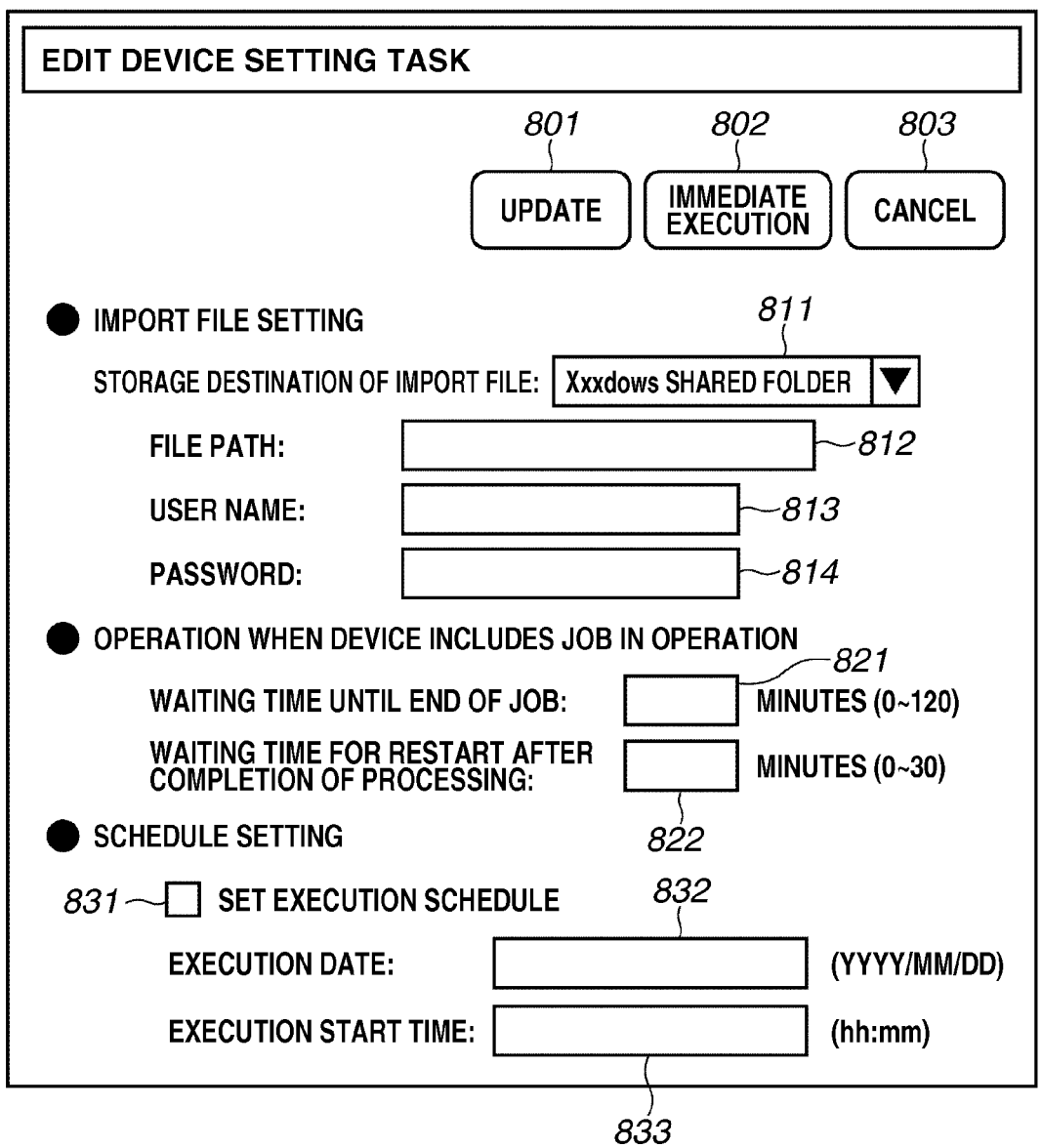
FIG. 8 is a diagram schematically illustrating a device setting task generation screen which a device setting task generation module displays on a web browser running on the information processing apparatus via the network by using a servlet and from which the administrator can generate a device setting task.

FIG. 8 is a diagram schematically illustrating a device setting task generation screen which the device setting task generation module 431 displays on a web browser running on the information processing apparatus 103 via the network 101 by using a servlet and from which the administrator can generate a device setting task.

In FIG. 8, an update button 801 is operable to update a setting or settings of a device setting task based on inputs on the screen. An immediate execution button 802 is operable to immediately execute a device setting task based on inputs on the screen. A cancel button 803 is operable to end the screen without setting a device setting task.

A storage destination type designation drop-down box 811 is operable to select a storage destination type 703. Alternatives include a Windows (registered trademark) shared folder and a file transfer protocol (FTP) server.

A file path entry field 812 is operable for the administrator to input the file path 704. A user name entry field 813 is operable for the administrator to input the user name 705 of the user that is used when accessing the file path 704. A password entry field 814 is operable for the administrator to input the password 706 of the user.

A setting processing pre-start job wait maximum waiting time entry field 821 is operable for the administrator to input the setting processing pre-start job wait maximum waiting time 707 of the device setting task to generate. A pre-restart job wait maximum waiting time entry field 822 is operable for the administrator to input the pre-restart job wait maximum waiting time 708 of the device setting task to generate.

An execution schedule setting enabling check box 831 is operable for the administrator to designate whether to set an execution schedule. A start time date section entry field 832 is operable for the administrator to input a date section of the start time 702. A start time time-section entry field 833 is operable for the administrator to input a time section of the start time 702.

Figure 13:
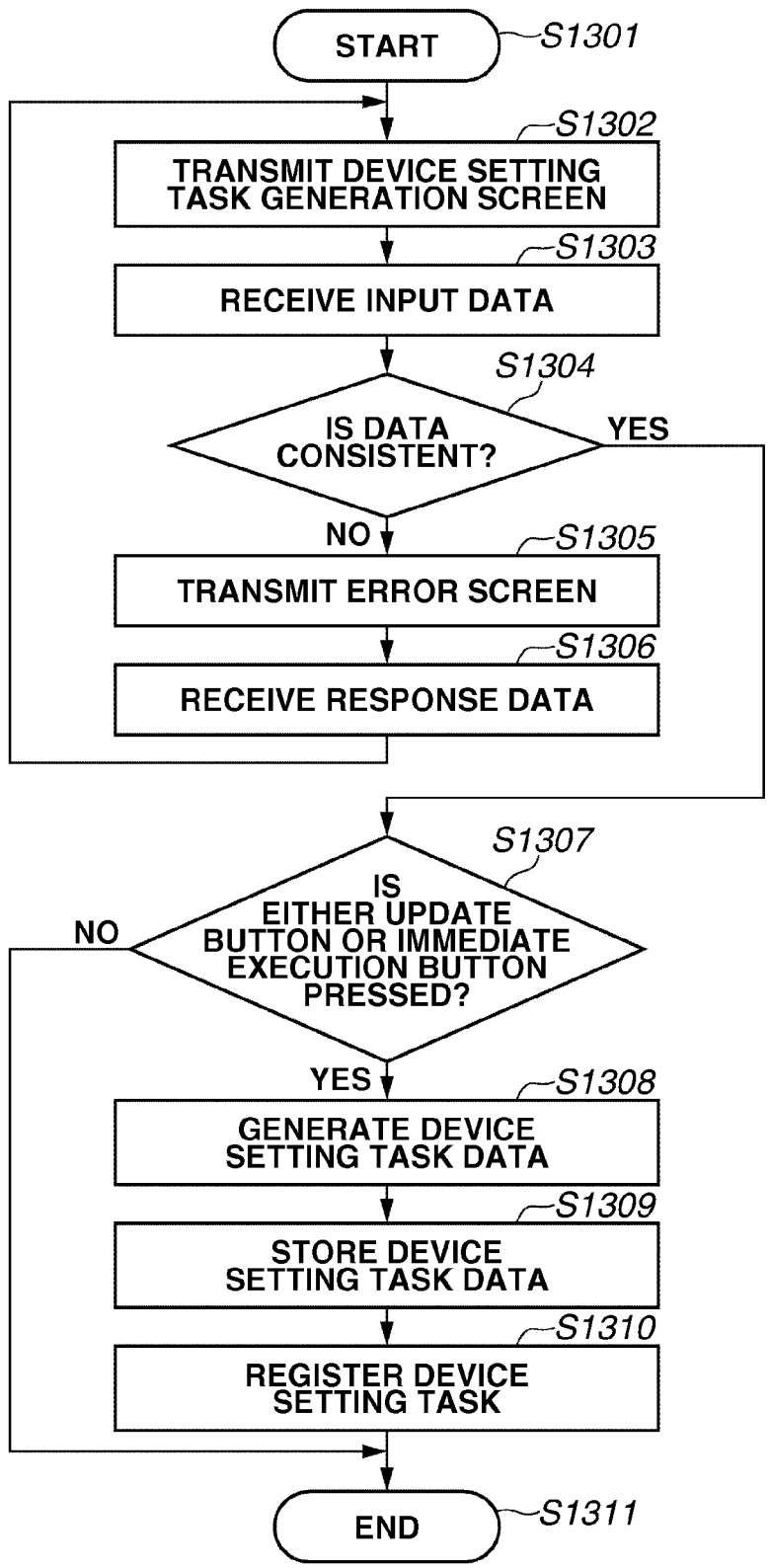
FIG. 13 is a flowchart illustrating an example of a procedure by which the device setting task generation module generates a device setting task.

Details of a procedure by which the device setting task generation module 431 generates a device setting task are illustrated in FIG. 13 to be described below.

Figure 9:
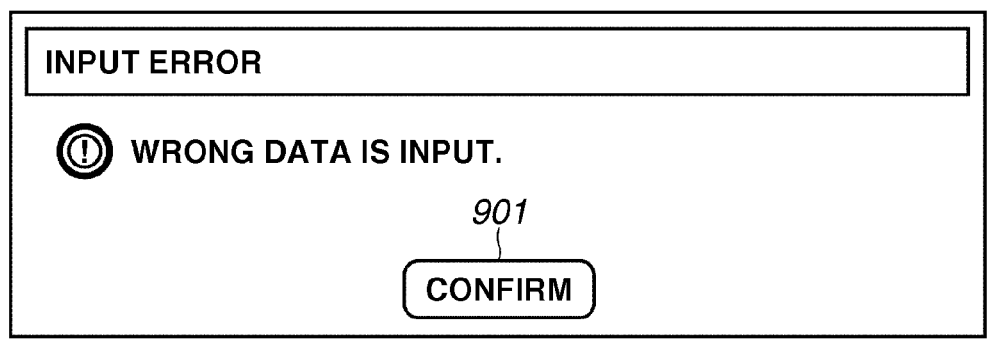
FIG. 9 is a diagram schematically illustrating an error screen.

FIG. 9 is a diagram schematically illustrating an error screen.

Suppose that the administrator makes inconsistent inputs on the power-off task generation screen (FIG. 6) or the device setting task generation screen (FIG. 8). If the administrator then presses the update button 601 or 801 or the immediate execution button 602 or 802, the power-off task generation module 421 or the device setting task generation module 431 determines that an error has occurred.

In such a case, the power-off task generation module 621 or the device setting task generation module 431 displays the error screen on a web browser of the information processing apparatus 103 via the network 101 by using a servlet. When a confirm button 901 is pressed, the power-off task generation module 621 or the device setting task generation module 431 closes the error screen.

Power-off task generation processing will be described below with reference to the flowchart of FIG. 10.

FIG. 10 is a flowchart illustrating an example of the procedure by which the power-off task generation module 421 generates a power-off task. The processing of this flowchart is implemented by the CPU inside the controller 202 executing a program stored in the internal ROM.

The power-off task generation module 421 initially receives a request to generate a power-off task from the information processing apparatus 103. In step S1001, the power-off task generation module 421 starts the processing.

In step S1002, the power-off task generation module 421 generates and transmits the power-off task generation screen (FIG. 6) to the information processing apparatus 103. A web browser is running on the information processing apparatus 103. The administrator inputs necessary information on the web browser and presses the update button 601 or the immediate execution button 602, or presses the cancel button 603 without inputting any particular information. After such operations, the information processing apparatus 103 transmits input data to the power-off task generation module 421.

In step S1003, the power-off task generation module 421 receives the input data transmitted from the information processing apparatus 103.

In step S1004, the power-off task generation module 421 checks whether the input data is consistent.

If the input data is determined not to be consistent (NO in step S1004), the power-off task generation module 421 advances the processing to step S1005.

In step S1005, the power-off task generation module 421 generates and transmits the error screen (FIG. 9) to the information processing apparatus 103. The web browser running on the information processing apparatus 103 draws the error screen (FIG. 9). The administrator examines the contents of the error screen and presses the confirm button 901. The information processing apparatus 103 transmits response data indicating that the confirm button 901 is pressed to the power-off task generation module 421.

In step S1006, the power-off task generation module 421 receives the response data indicating that the confirm button 901 is pressed, and performs control to return to step S1002 and continue the processing.

If, in step S1004, the input data is determined to be consistent (YES in step S1004), the power-off task generation module 421 advances the processing to step S1007.

In step S1007, the power-off task generation module 421 examines the contents of the input data to check whether the button the administrator has pressed is either of the update button 601 and the immediate execution button 602.

If the pressed button is determined to be neither the update button 601 nor the immediate execution button 602 (NO in step S1007), the pressed button turns out to be the cancel button 603. In step S1011, the power-off task generation module 421 simply ends the power-off task generation processing.

On the other hand, if the pressed button is determined to be either the update button 601 or the immediate execution button 602 (YES in step S1007), the power-off task generation module 421 advances the processing to step S1008.

In step S1008, the power-off task generation module 421 generates power-off task data (FIG. 5) from the contents of the input data.

In step S1009, the power-off task generation module 421 stores the power-off task data generated in step S1008 into the power-off task data storage module 423.

In step S1010, the power-off task generation module 421 calls the power-off task registration module 424 to register a power-off task corresponding to the power-off task data stored in step S1009. The power-off task generation module 421 passes a pointer of the power-off task data corresponding to the task to be registered to the power-off task registration module 424. The pointer indicates the storage location of the power-off task data in the power-off task data storage module 423. By such registration processing, schedule data (FIG. 11) on the power-off task is stored into the schedule data storage module 442. Details of the processing for registering a power-off task are illustrated in FIG. 12. After the registration of the power-off task is completed, then in step S1011, the power-off task generation module 421 completes the power-off task generation processing.

Schedule data will be described with reference to FIG. 11.

Figure 11:
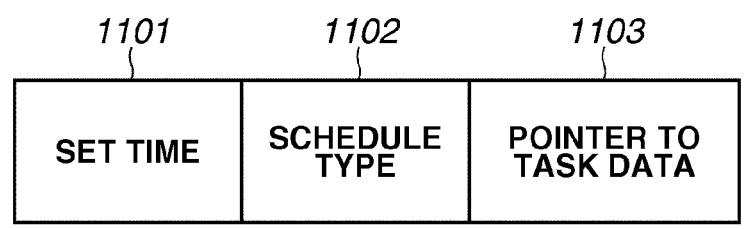
FIG. 11 is a diagram schematically illustrating schedule data for a timer unit to process.
Figure 12:
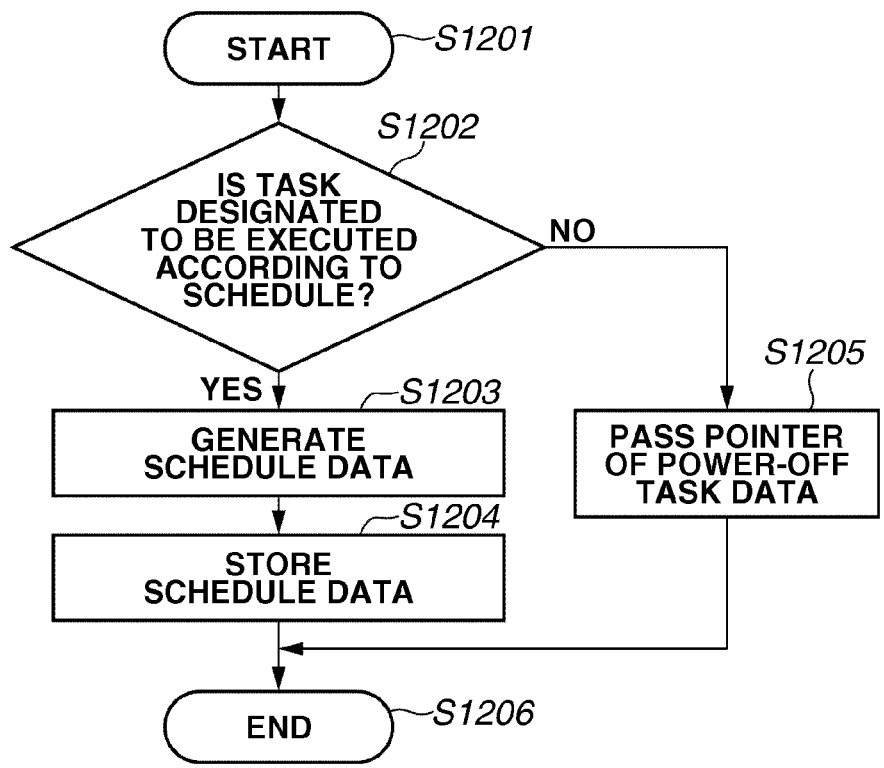
FIG. 12 is a flowchart illustrating an example of a procedure by which a power-off task registration module registers a power-off task.

FIG. 11 is a diagram schematically illustrating schedule data for the timer unit 411 to process.

In FIG. 11, the schedule data includes a set time 1101 of the schedule, data 1102 indicating a schedule type (a power-off task or a device setting task), and a pointer 1103 to power-off task data or device setting task data.

Power-off task registration processing will be described below with reference to the flowchart of FIG. 12.

FIG. 12 is a flowchart illustrating an example of a procedure by which the power-off task registration module 424 registers a power-off task. The processing of this flowchart is implemented by the CPU inside the controller 202 executing a program stored in the internal ROM.

The power-off task generation module 421 initially calls the power-off task registration module 424. In step S1201, the power-off task registration module 424 starts the processing. The power-off task registration module 424, when called, receives the pointer (indicating the storage location in the power-off task data storage module 423) of the power-off task data corresponding to the task to be registered from the power-off task generation module 421.

In step S1202, the power-off task registration module 424 determines whether the task to be registered is designated to be executed according to a schedule or designated to be immediately executed, based on the power-off task data read from the pointer designated by the power-off task generation module 421.

If the task is determined to be designated to be executed according to a schedule (YES in step S1202), the power-off task registration module 424 advances the processing to step S1203.

In step S1203, the power-off task registration module 424 generates schedule data (FIG. 11) based on the power-off task data read from the pointer designated by the power-off task generation module 421.

In step S1204, the power-off task registration module 424 stores the schedule data generated in step S1203 into the schedule data storage module 442 of the timer unit 411. In step S1206, the power-off task registration module 424 completes the processing. When the schedule data is stored into the schedule data storage module 442, the set time 1101 is registered into a timer. When the set time 1101 is reached to produce a signal, the timer notification module 441 makes a notification to the task control unit 413. Note that the set time 1101 of the schedule data stored in the schedule data storage module 442 is also registered into the timer when the MFP 102 is restarted. The timer unit 411 is capable of registering only one power-off task.

If, in step S1202, the task is determined to be not designated to be executed according to a schedule, i.e., to be designated to be immediately executed (NO in step S1202), the power-off task registration module 424 advances the processing to step S1205.

In step S1205, the power-off task registration module 424 passes the pointer of the designated power-off task data to the task control unit 413 for immediate execution. In step S1206, the power-off task registration module 424 completes the processing.

Device setting task generation processing will be described below with reference to FIG. 13.

FIG. 13 is a flowchart illustrating an example of the procedure by which the device setting task generation module 431 generates a device setting task. The processing of this flowchart is implemented by the CPU inside the controller 202 executing a program stored in the internal ROM.

The device setting task generation module 431 initially receives a request to generate a device setting task from the information processing apparatus 103. In step S1301, the device setting task generation module 431 starts the processing.

In step S1302, the device setting task generation module 431 generates and transmits the device setting task generation screen (FIG. 8) to the information processing unit 103. A web browser is running on the information processing apparatus 103. The administrator inputs necessary information and presses the update button 801 or the immediate execution button 802, or presses the cancel button 803 without inputting any particular information. After such operations, the information processing apparatus 103 transmits input data to the device setting task generation module 431.

In step S1303, the device setting task generation module 431 receives the input data transmitted from the information processing apparatus 103.

In step S1304, the device setting task generation module 431 checks whether the input data is consistent.

If the input data is determined not to be consistent (NO in step S1304), the device setting task generation module 431 advances the processing to step S1305.

In step S1305, the device setting task generation module 431 generates and transmits the error screen (FIG. 9) to the information processing apparatus 103. The web browser running on the information processing apparatus 103 draws the error screen (FIG. 9). The administrator examines the contents of the error screen and presses the confirm button 901. The information processing apparatus 103 transmits response data indicating that the confirm button 901 is pressed to the device setting task generation module 431.

In step S1306, the device setting task generation module 431 receives the response data indicating that the confirm button 901 is pressed, and performs control to return to step S1302 and continue the processing.

If, in step S1304, the input data is determined to be consistent (YES in step S1304), the device setting task generation module 431 advances the processing to step S1307.

In step S1307, the device setting task generation module 431 examines the contents of the input data to check whether the button the administrator has pressed is either of the update button 801 or the immediate execution button 802.

If the pressed button is determined to be neither of the update button 801 and the immediate execution button 802 (NO in step S1307), the pressed button turns out to be the cancel button 803. In step S1311, the device setting task generation module 431 simply completes the device setting task generation processing.

On the other hand, if the pressed button is determined to be either the update button 801 or the intermediate execution button 802 (YES in step S1307), the device setting task generation module 431 advances the processing to step S1308.

In step S1308, the device setting task generation module 431 generates device setting task data (FIG. 7) from the contents of the input data.

In step S1309, the device setting task generation module 431 stores the device setting task data into the device setting task data storage module 435.

Figure 14:
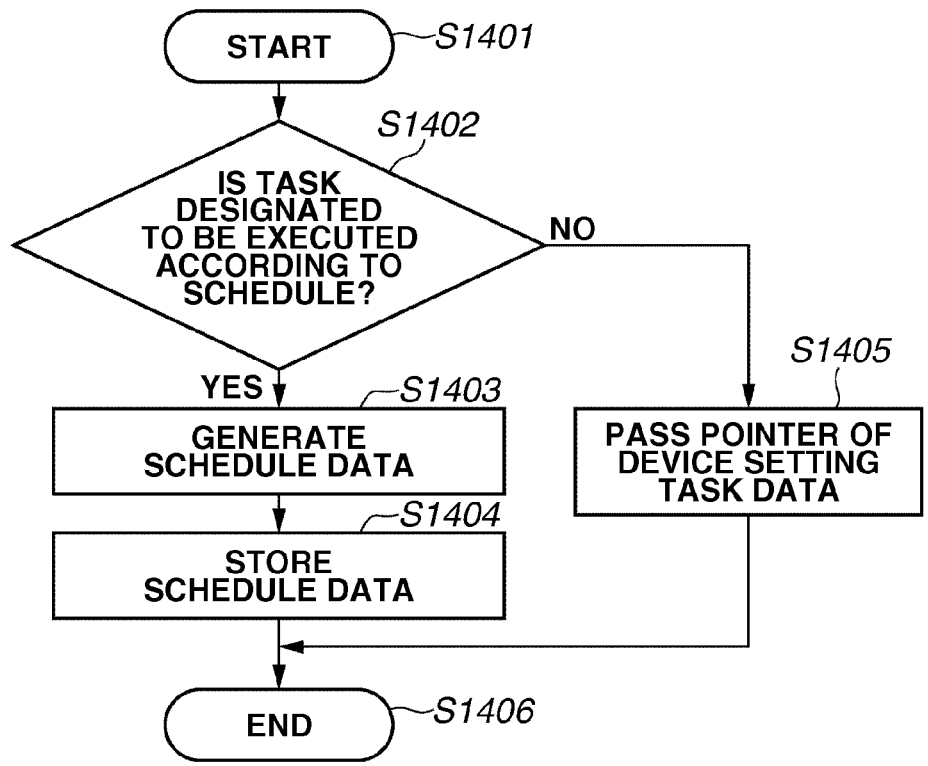
FIG. 14 is a flowchart illustrating an example of a procedure by which a device setting task registration module registers a device setting task.

In step S1310, the device setting task generation module 431 calls the device setting task registration module 436 to register a device setting task corresponding to the device setting task data stored into the device setting task data storage module 435 in step S1309. The device setting task generation module 431 passes a pointer of the device setting task data corresponding to the task to be registered to the device setting task registration module 436. The pointer indicates the storage location of the device setting task data in the device setting task data storage module 435. By such registration processing, schedule data (FIG. 11) on the device setting task is stored into the schedule data storage module 442. Details of the processing for registering a device setting task are illustrated in FIG. 14. After the registration of the device setting task is completed, then in step S1311, the device setting task generation module 431 completes the device setting task generation processing.

Device setting task registration processing will be described below with reference to the flowchart of FIG. 14.

FIG. 14 is a flowchart illustrating an example of a procedure by which the device setting task registration module 436 registers a device setting task. The processing of this flowchart is implemented by the CPU inside the controller 202 executing a program stored in the internal ROM.

The device setting task generation module 431 initially calls the device setting task registration module 436. In step S1401, the device setting task registration module 436 starts the processing. The device setting task registration module 436, when called, receives the pointer (indicating the storage location in the device setting task data storage module 435) of the device setting task data corresponding to the task to be registered from the device setting task generation module 431.

In step S1402, the device setting task registration module 436 determines whether the task to be registered is designated to be executed according to a schedule or designated to be immediately executed, based on the device setting task data read from the pointer designated by the device setting task generation module 431.

If the task is determined to be designated to be executed according to a schedule (YES in step S1402), the device setting task registration module 436 advances the processing to step S1403.

In step S1403, the device setting task registration module 436 generates schedule data (FIG. 11) based on the device setting task data read from the pointer designated by the device setting task generation module 431.

In step S1404, the device setting task registration module 436 stores the schedule data generated in step S1403 into the schedule data storage module 442 of the timer unit 411. In step S1406, the device setting task registration module 436 completes the processing. When the schedule data is stored into the schedule data storage module 442, the set time 1101 is registered into a timer. When the set time 1101 is reached to produce a signal, the timer notification module 441 makes a notification to the task control unit 413. Note that the set time 1101 of the schedule data stored in the schedule data storage module 442 is also registered into the timer when the MFP 102 is restarted. The timer unit 411 is capable of registering only one device setting task.

If, in step S1402, the task is determined to be not designated to be executed according to a schedule, i.e., to be designated to be immediately executed (NO in step S1402), the device setting task registration module 436 advances the processing to step S1405.

In step S1405, the device setting task registration module 436 passes the pointer of the designated device setting task data to the task control unit 413. In step S1406, the device setting task registration module 436 completes the processing.

Next, processing for calling a scheduled task will be described with reference to the flowchart of FIG. 15.

FIG. 15 is a flowchart illustrating an example of a procedure by which the timer notification module 441 calls a scheduled task. The processing of this flowchart is implemented by the CPU inside the controller 202 executing a program stored in the internal ROM.

The timer notification module 441 is called at startup time and at predetermined timing. In step S1501, the timer notification module 441 starts the processing.

In step S1502, the timer notification module 441 checks whether it is immediately after startup.

If it is determined to be immediately after startup (YES in step S1502), the timer notification unit 441 advances the processing to step S1503.

In step S1503, the timer notification unit 441 determines whether there is a schedule designated for next startup time. More specifically, the timer notification unit 441 determines whether the schedule data storage module 442 contains schedule data (FIG. 11) in which the set time 1101 has a special time value (99:99) representing "next startup time."

If there is determined to be no schedule designated for next startup time, i.e., the schedule data storage module 442 is determined to contain no schedule data in which the set time 1101 has the special time value (99:99) representing "next startup time" (NO in step S1503), the timer notification module 441 advances the processing to step S1504.

If, in step S1502, it is determined not to be immediately after startup (NO in step S1502), the timer notification module 441 advances the processing to step S1504.

In step S1504, the timer notification module 441 checks whether it is a time registered in the schedule data, i.e., whether the current time has reached the set time 1101 included in each piece of the schedule data (FIG. 11) stored in the schedule data storage module 442. Note that the network device management system is configured so that the set time 1101 included in each piece of schedule data is registered into a timer when stored, and that the set time 1101 has been reached can be known by receiving a signal from the timer.

If it is determined not to be a time registered in the schedule data, i.e., the current time is determined not to have reached a set time 1101 registered in the schedule data (NO in step S1504), the timer notification module 441 returns to step S1504 and continues the processing.

On the other hand, if it is determined to be a time registered in the schedule data, i.e., the current time is determined to have reached a set time 1101 registered in the schedule data (YES in step S1504), the timer notification module 441 advances the processing to step S1505.

If, in step S1503, there is determined to be a schedule designated for next startup time, i.e., the schedule data storage module 442 is determined to contain schedule data in which the set time 1101 has the special time value (99:99) representing "next startup time" (YES in step S1503), the timer notification module 441 advances the processing to step S1505.

In step S1505, the timer notification module 441 acquires the schedule data that is determined to have reached the registered time in step S1504 or the schedule that is determined to be designated for next startup time in step S1503.

In step S1506, the timer notification module 441 acquires the pointer 1103 to the task data included in the schedule data acquired in step S1505.

In step S1507, the timer notification module 441 passes the pointer 1103 of the task data acquired in step S1506 to the task control unit 413. In step S1508, the timer notification module 441 ends the processing. As a result, the task is called and processed.

Processing of a power-off task and a device setting task by the task control unit 413 will be described below with reference to the flowcharts of FIGS. 16A to 16G.

Figure 16A:
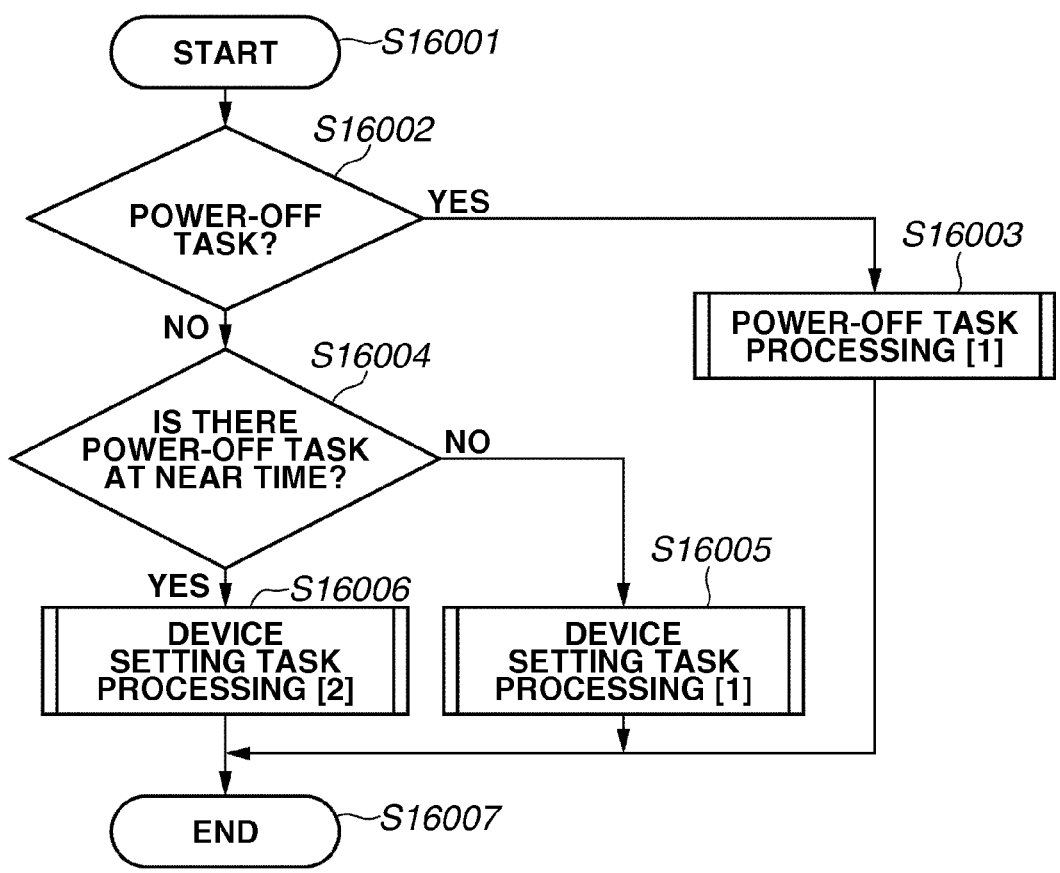
FIG. 16A is a flowchart illustrating main processing of a task control unit.

FIG. 16A is a flowchart illustrating main processing of the task control unit 413. The processing of this flowchart is implemented by the CPU inside the controller 202 executing a program stored in the internal ROM.

The timer notification module 441, the power-off task registration module 424, or the device setting task registration module 436 passes a pointer 1103 of task data to the task control unit 413. In step S16001, the task control unit 413 starts the processing.

In step S16002, the task control unit 413 reads the task data corresponding to the passed pointer, and checks whether the task data is of a power-off task.

Figure 16B:
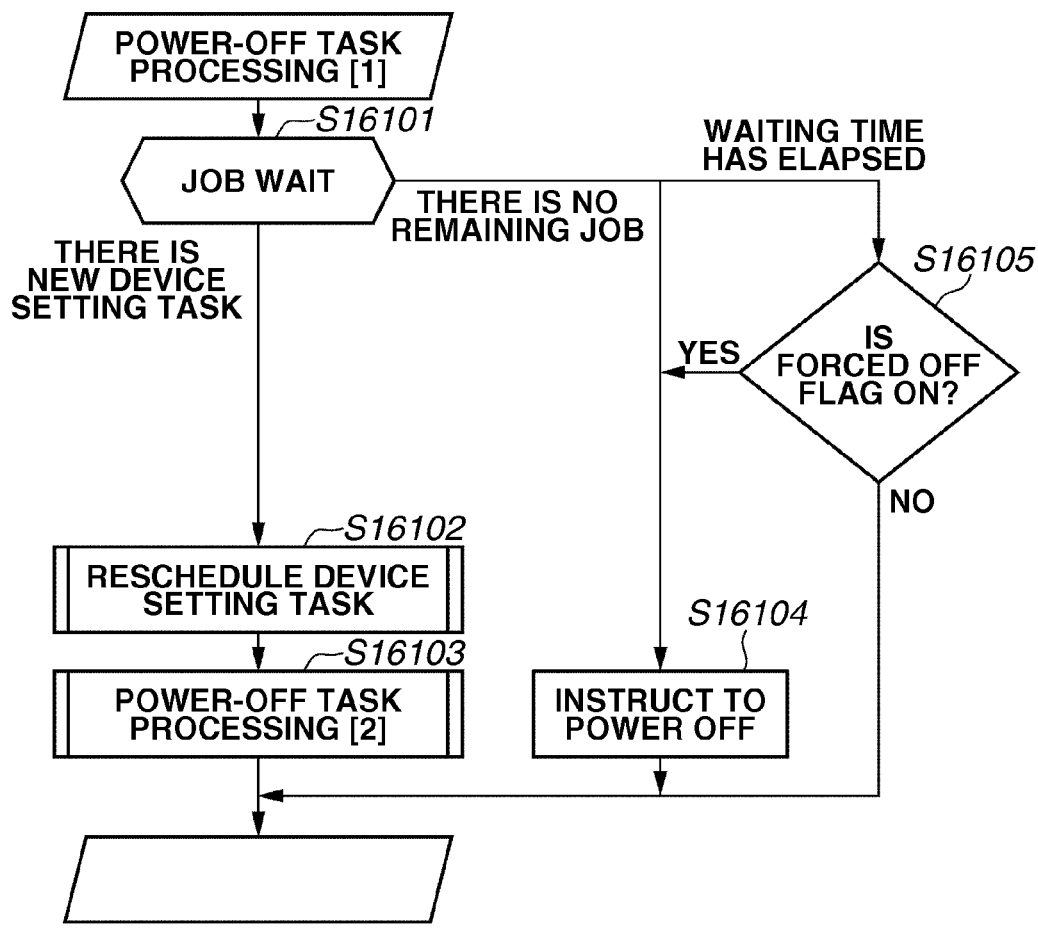
FIG. 16B is a flowchart illustrating power-off task processing [1] of the task control unit.

If the task data corresponding to the passed pointer is determined to be of a power-off task (YES in step S16002), then in step S16003, the task control unit 413 performs power-off task processing [1] (FIG. 16B). Exiting from the power-off task processing [1] in step S16003, then in step S16007, the task control unit 413 ends the processing.

On the other hand, if the task data corresponding to the passed pointer is determined not to be of a power-off task (NO in step S16002), the task data is device setting task data. The task control unit 413 advances the processing to step S16004.

In step S16004, the task control unit 413 refers to the start time 702 of the device setting task data corresponding to the passed pointer, and refers to the power-off task data storage module 423 to check whether there is a power-off task at a time (near time) within predetermined time Ti from the start time 702.

Figure 16C:
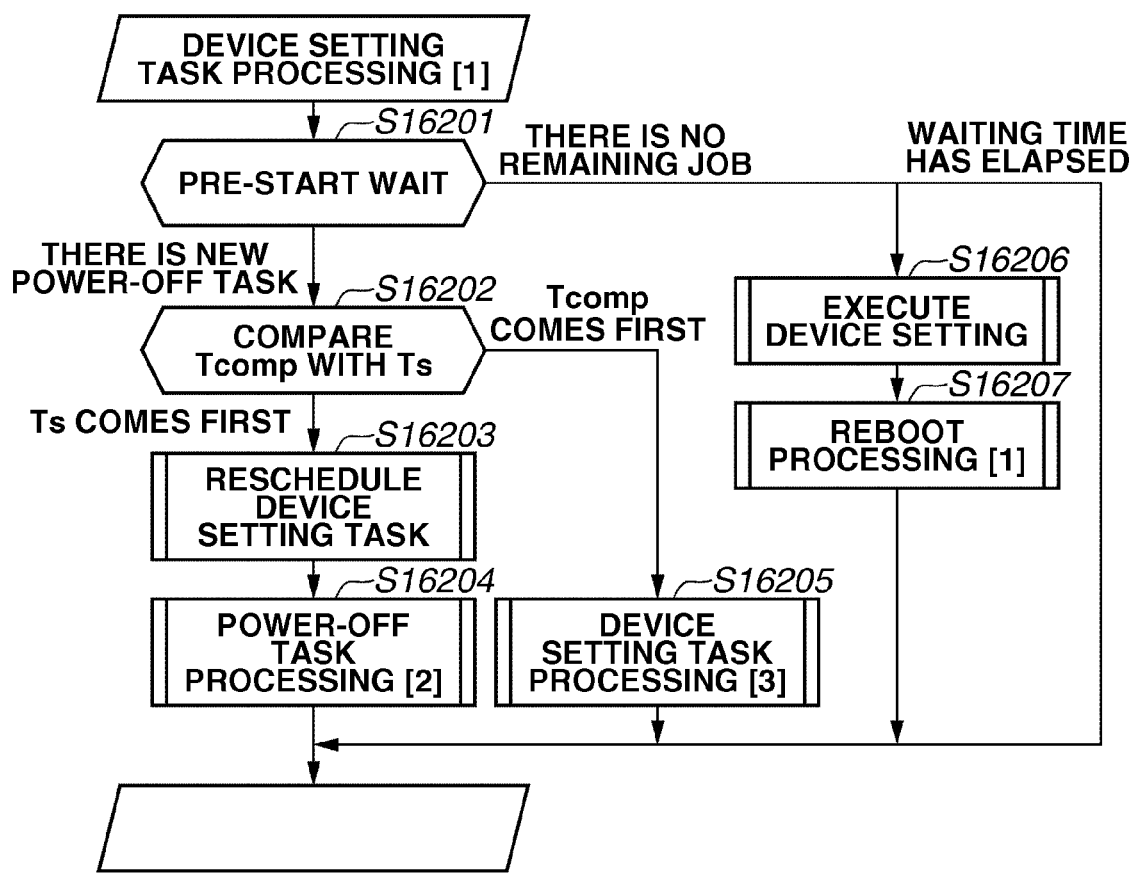
FIG. 16C is a flowchart illustrating device setting task processing [1] of the task control unit.

If there is determined to be no power-off task at a time (near time) within the time Ti from the start time 702 of the device setting task data (NO in step S16004), then in step S16005, the task control unit 413 performs device setting task processing [1] (FIG. 16C). Exiting from the device setting task processing [1] in step S16005, then in step S16007, the task control unit 413 ends the processing.

Figure 16D:
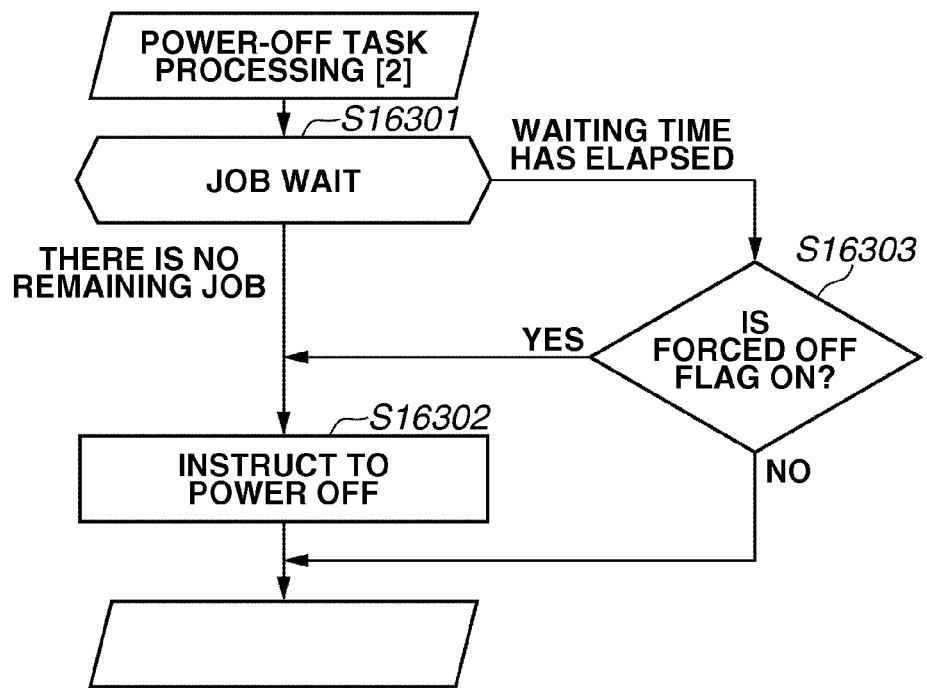
FIG. 16D is a flowchart illustrating power-off task processing [2] of the task control unit.
Figure 16E:
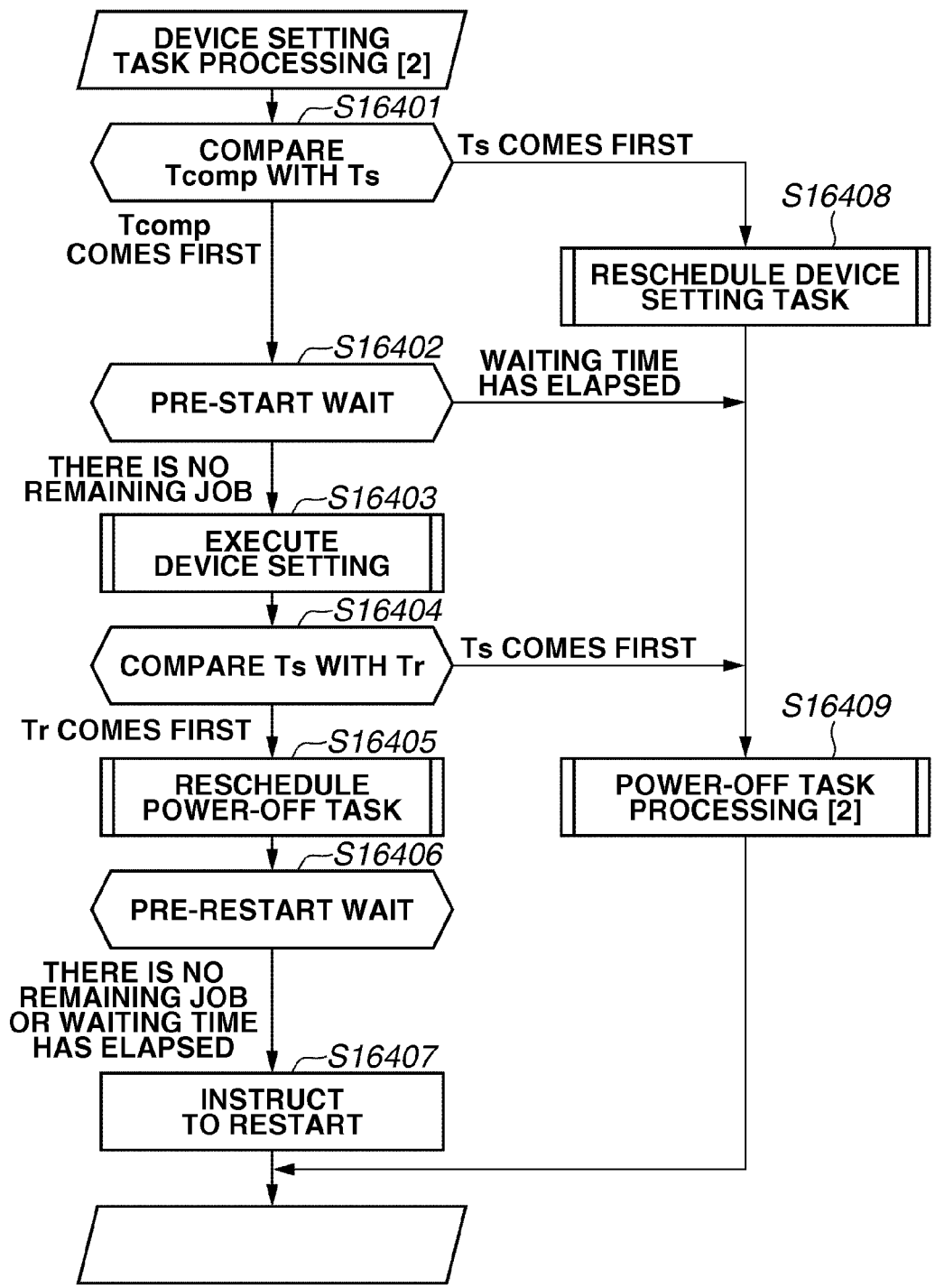
FIG. 16E is a flowchart illustrating device setting task processing [2] of the task control unit.

On the other hand, if there is determined to be a power-off task at a time (near time) within the time Ti from the start time 702 of the device setting task data (YES in step S16004), then in step S16006, the task control unit 413 performs device setting task processing [2] (FIG. 16E). Exiting from the device setting task processing [2] in step S16006, then in step S16007, the task control unit 413 ends the processing.

Next, the power-off task processing [1] will be described.

FIG. 16B is a flowchart illustrating the power-off task processing [1] of the task control unit 413. The processing of this flowchart is implemented by the CPU inside the controller 202 executing a program stored in the internal ROM.

In step S16101 of the power-off task processing [1], the task control unit 413 initially performs a job wait (power-off wait). In this step, the task control unit 413 waits until time has elapsed as much as the job wait maximum waiting time 503 of the power-off task currently in process, until there becomes no remaining job in the meantime, or until a new device setting task is issued in the meantime.

If a new device setting task is determined to be issued during the job wait in step S16101 ("THERE IS NEW DEVICE SETTING TASK" in step S16101), the task control unit 413 advances the processing to step S16102. The situation where "a new device setting task is issued" refers to when a pointer of new device setting task data is passed to the task control unit 413 (step S1507 of FIG. 15 or step S1405 of FIG. 14).

In step S16102, the task control unit 413 reschedules the device setting task. More specifically, the task control unit 413 generates new device setting task data in which the start time 702 has the special time value "99:99" representing next startup time by using the contents of the task data on the new device setting task issued. The task control unit 413 registers the generated device setting task data by using the device setting task registration module 436. After the registration, the task control unit 413 advances the processing to step S16103.

In step S16103, the task control unit 413 performs power-off task processing [2] (FIG. 16D). Exiting from the power-off task processing [2] in step S16103, the task control unit 413 exits from the power-off task processing [1] and advances the processing to the next step according to the processing procedure of the calling source.

If there is determined to be no remaining job during the job wait in step S16101 ("THERE IS NO REMAINING JOB" in step S16101), the task control unit 413 advances the processing to step S16104. If, in step S16101, there is no job from the beginning, the task control unit 413 also advances the processing to step S16104.

In step S16104, the task control unit 413 instructs the power-off execution module 422 to power off. The task control unit 413 then exits from the power-off task processing [1] and advances the processing to the next step according to the processing procedure of the calling source.

If the job wait maximum waiting time 503 is determined to have elapsed during the job wait in step S16101 ("WAITING TIME HAS ELAPSED" in step S16101), the task control unit 413 advances the processing to step S16105. Such a situation corresponds to the case where all jobs are not completed before the lapse of the job wait maximum waiting time 503.

In step S16105, the task control unit 413 checks whether the forced off flag 504 of the power-off task data is on.

If the forced off flag 504 of the power-off task data is determined to be on (YES in step S16105), the task control unit 413 advances the processing to step S16104 and instructs the power-off execution module 422 to power off.

On the other hand, if the forced off flag 504 of the power-off task data is determined not to be on (NO in step S16105), the task control unit 413 simply exits from the power-off task processing [1] and advances the processing to the next step according to the processing procedure of the calling source. In other words, no power-off is executed according to the user's intention (setting of the forced off flag 504).

Next, the device setting task processing [1] will be described.

FIG. 16C is a flowchart illustrating the device setting task processing [1] of the task control unit 413. The processing of this flowchart is implemented by the CPU inside the controller 202 executing a program stored in the internal ROM.

In step S16201 of the device setting task processing [1], the task control unit 413 initially performs a pre-start wait. In this step, the task control unit 413 waits until time has elapsed as much as the setting processing pre-start job wait maximum waiting time 707 of the device setting task currently in process, until there becomes no remaining job in the meantime, or until a new power-off task is issued in the meantime.

If a new power-off task is determined to be issued during the pre-start wait in step S16201 ("THERE IS NEW POWER-OFF TASK" in step S16201), the task control unit 413 advances the processing to step S16202. The situation where "a new power-off task is issued" refers to when a pointer of new power-off task data is passed to the task control unit 413 (step S1507 of FIG. 15 or step S1205 of FIG. 12).

In step S16202, the task control unit 413 compares a device setting processing completion expected final time Tcomp of the device setting task currently in process with a final execution time Ts of the power-off task. The final execution time Ts of the power-off task refers to a time when the job wait maximum waiting time 503 has elapsed since the start time 502 of the new power-off task. A time when the setting processing pre-start job wait maximum waiting time 707 has elapsed since the start time 702 of the device setting task in process will be referred to as a device setting processing start final time Tw. A maximum amount of time that is expected to be needed for the device setting value acquisition module 432 to acquire a device setting value file will be denoted by Tf. A maximum amount of time Tc that is expected to be needed for the device setting execution module 433 to complete device setting since start of execution will be denoted by Tc. The device setting processing completion expected final time Tcomp at which the device setting execution module 433 is expected to complete executing the device setting is calculated by Tw+Tf+Tc.

If, in step S16202, Tcomp is determined to be greater, i.e., the final execution time Ts of the power-off task is determined to come first ("Ts COMES FIRST" in step S16202), the task control unit 413 advances the processing to step S16203.

In step S16203, the task control unit 413 reschedules the device setting task. More specifically, the task control unit 413 generates new device setting task data in which the start time 702 has the special time value "99:99" representing next startup time by using the contents of the task data of the device setting task currently in process. The task control unit 413 registers the generated device setting task data by using the device setting task registration module 436. After the registration, the task control unit 413 advances the processing to step S16204.

In step S16204, the task control unit 413 performs the power-off task processing [2] (FIG. 16D). Exiting from the power-off task processing [2] in step S16204, the task control unit 413 exits from the device setting task processing [1] and advances the processing to the next step according to the processing procedure of the calling source.

If, in step S16202, Ts is determined to be greater, i.e., the device setting processing completion expected final time Tcomp is determined to come first ("Tcomp COMES FIRST" in step S16202), the task control unit 413 advances the processing to step S16205.

Figure 16F:
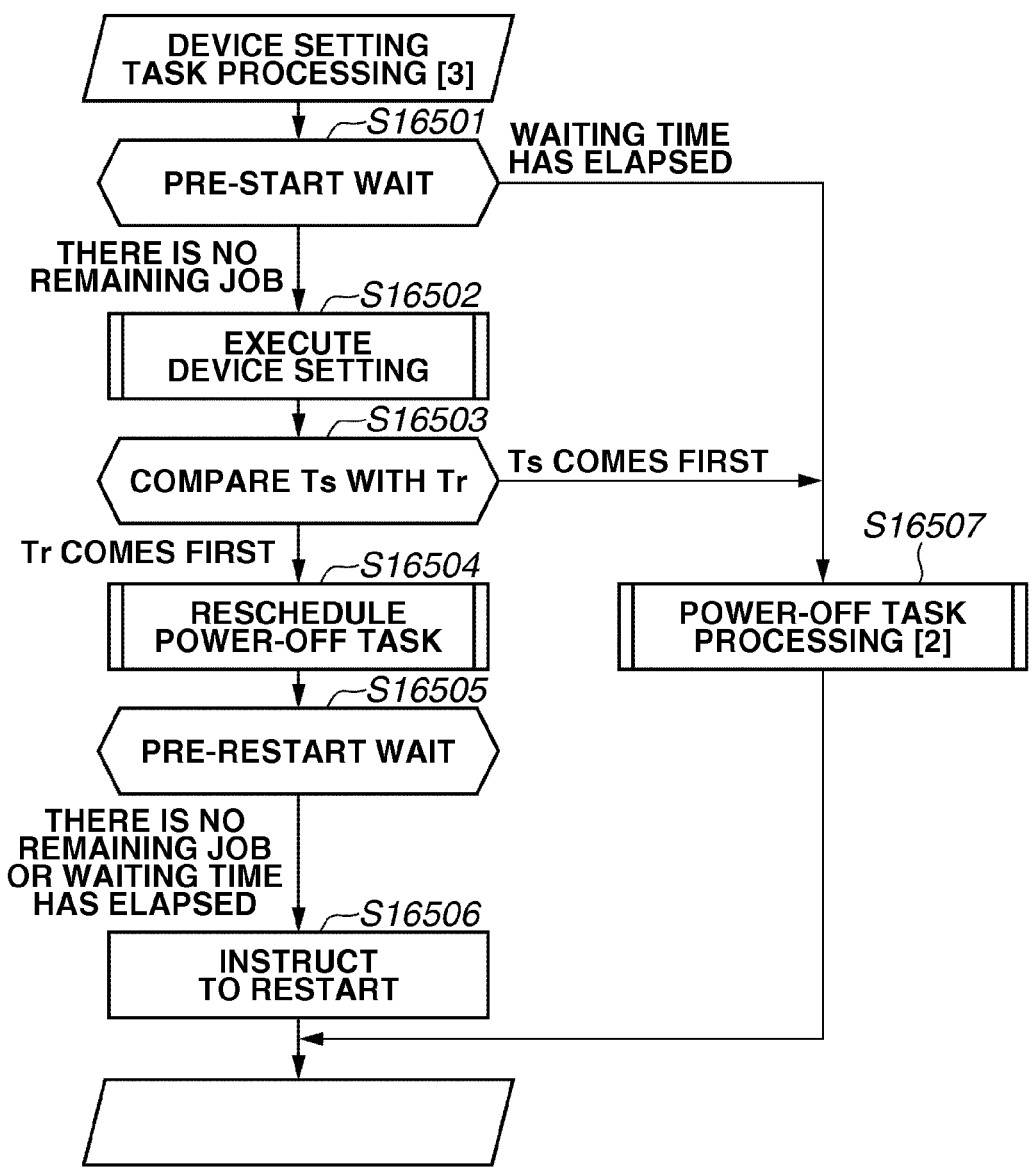
FIG. 16F is a flowchart illustrating device setting task processing [3] of the task control unit.

In step S16205, the task control unit 413 performs device setting task processing [3] (FIG. 16F). Exiting from the device setting task processing [3] in step S16205, the task control unit 413 exits from the device setting task processing [1] and advances the processing to the next step according to the processing procedure of the calling source.

If there is determined to be no remaining job during the pre-start wait in step S16201 ("THERE IS NO REMAINING JOB" in step S16201), the task control unit 413 advances the processing to step S16206.

In step S16206, the task control unit 413 executes device setting. To execute the device setting, the task control unit 413 initially causes the device setting value acquisition module 432 to acquire the device setting value file. By using the acquired device setting value file, the task control unit 413 then causes the device setting execution module 433 to execute device setting.

Figure 16G:
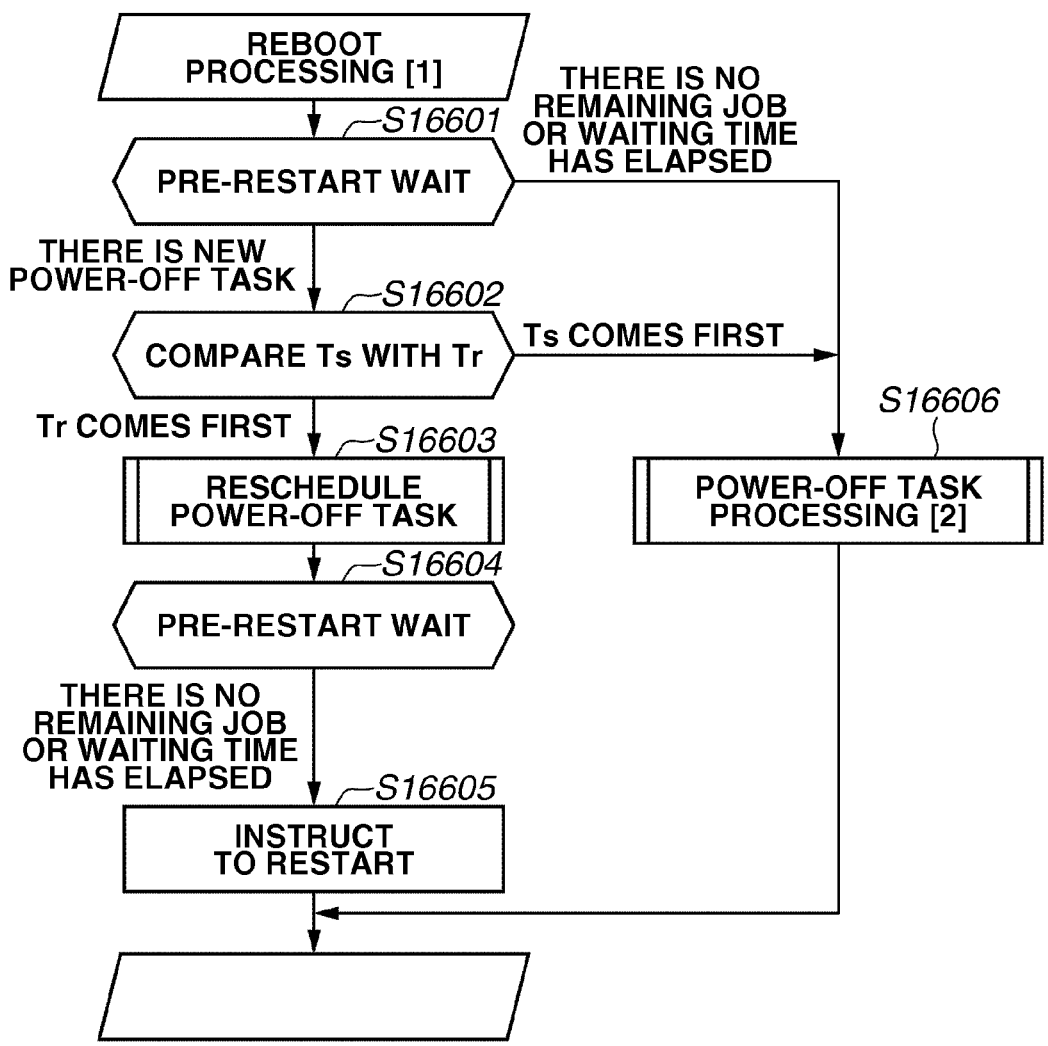
FIG. 16G is a flowchart illustrating reboot processing [1] of the task control unit.

After the completion of the execution of the device setting in step S16206, then in step S16207, the task control unit 413 performs reboot processing [1] (FIG. 16G). Exiting from the reboot processing [1] in step S16206, the task control unit 413 exits from the device setting task processing [1] and advances the processing to the next step according to the processing procedure of the calling source.

If the setting processing pre-start job wait maximum waiting time 707 is determined to have elapsed during the pre-start wait in step S16201 ("WAITING TIME HAS ELAPSED" in step S16201), the task control unit 413 simply exits from the device setting task processing [1] and advances the processing to the next step according to the processing procedure of the calling source.

Next, the power-off task processing [2] will be described.

FIG. 16D is a flowchart illustrating the power-off task processing [2] of the task control unit 413. The processing of this flowchart is implemented by the CPU inside the controller 202 executing a program stored in the internal ROM.

In step S16301 of the power-off task processing [2], the task control unit 413 initially performs a job wait. In this step, the task control unit 413 waits until the job wait maximum waiting time 503 of the task data on the power-off task currently in process has elapsed or until there becomes no remaining job in the meantime. That the job wait maximum waiting time 503 has elapsed refers to the lapse of the job wait maximum waiting time 503 since the start time 502 of the power-off task currently in process.

If there is determined to be no remaining job during the job wait in step S16301 ("THERE IS NO REMAINING JOB" in step S16301), the task control unit 413 advances the processing to step S16302.

In step S16302, the task control unit 413 instructs the power-off execution module 422 to power off. After the completion of the instruction, the task control unit 413 exits from the power-off task processing [2] and advances the processing to the next step according to the processing procedure of the calling source.

If the job wait maximum waiting time 503 is determined to have elapsed during the job wait in step S16301 ("WAITING TIME HAS ELAPSED" in step S16301), the task control unit 413 advances the processing to step S16303.

In step S16303, the task control unit 413 checks whether the forced off flag 504 is on.

If the forced off flag 504 is determined to be on (YES in step S16303), the task control unit 413 advances the processing to step S16302 and instructs the power-off execution module 422 to power off.

On the other hand, if the forced off flag 504 is determined not to be on (NO in step S16303), the task control unit 413 simply exits from the power-off task processing [2] and advances the processing to the next step according to the processing procedure of the calling source. In other words, no power-off is executed according to the user's intention (setting of the forced off flag 504).

Next, the device setting task processing [2] will be described.

FIG. 16E is a flowchart illustrating the device setting task processing [2] of the task control unit 413. The processing of this flowchart is implemented by the CPU inside the controller 202 executing a program stored in the internal ROM.

In step S16401 of the device setting task processing [2], the task control unit 413 initially compares Tcomp of the device setting task currently in process with Ts of the power-off task at a near time.

If Tcomp is determined to be smaller, i.e., the device setting processing completion expected final time Tcomp is determined to come first ("Tcomp COMES FIRST" in step S16401), the task control unit 413 advances the processing to step S16402.

In step S16402, the task control unit 413 performs a pre-start wait. In this step, the task control unit 413 waits until time has elapsed a much as the setting processing pre-start job wait maximum waiting time 707 of the device setting task in process or until there becomes no remaining job in the meantime. That the setting processing pre-start jog wait maximum waiting time 707 has elapsed refers to the lapse of the setting processing pre-start job wait maximum waiting time 707 since the start time 702 of the device setting task in process.

If there is determined to be no remaining job during the pre-start wait in step S16402 ("THERE IS NO REMAINING JOB" in step S16402), the task control unit 413 advances the processing to step S16403. In step S16403, the task control unit 413 executes device setting. To execute the device setting, the task control unit 413 initially causes the device setting value acquisition module 432 to acquire the device setting value file. By using the acquired device setting, the task control unit 413 then causes the device setting execution module 433 to execute the device setting. After the execution of the device setting, the task control unit 413 advances the processing to step S16404.

In step S16404, the task control unit 413 compares the final execution time Ts of the power-off task with a time Tr (hereinafter, referred to as a restart completion expected final time Tr). The restart completion expected final time Tr is when a predetermined restart omission determination criterion time Tn (for example, pre-restart job wait maximum waiting time 708+restart execution time+time corresponding to the starting time of the device) has elapsed since the current time.

If the restart completion expected final time Tr is determined to be smaller (Tr to come first), i.e., Ts exceeds a restart omission determination criterion ("Tr COMES FIRST" in step S16404), the task control unit 413 advances the processing to step S16405 to perform a restart by priority.

In step S16405, the task control unit 413 reschedules the power-off task. More specifically, the task control unit 413 generates and registers new power-off task data in which the start time 502 has "99:99" representing execution at next startup time by using the contents of the task data of the foregoing power-off task. The task control unit 413 then deletes the foregoing power-off task. The task control unit 413 then advances the processing to step S16406.

In step S16406, the task control unit 413 performs a pre-restart wait. In the pre-restart wait, the task control unit 413 waits until there is no remaining job or until the pre-restart job wait maximum waiting time 708 of the device setting task in process has elapsed. When there is no remaining job or the pre-restart job wait maximum waiting time 708 has elapsed, the task control unit 413 advances the processing to step S16407.

In step S16407, the task control unit 413 instructs the restart execution module 434 to restart. The task control unit 413 exits from the device setting task processing [2] and advances the processing to the next step according to the processing procedure of the calling source.

If, in step S16401, Ts is determined to come first, i.e., the final execution time Ts of the power-off task is determined to come first ("Ts COMES FIRST" in step S16401), the task control unit 413 advances the processing to step S16408.

In step S16408, the task control unit 413 reschedules the device setting task in process. Specifically, the task control unit 413 generates and registers new device setting task data in which the start time 702 has "99:99" representing execution at next startup time by utilizing the data of the device setting task in process. The task control unit 413 then deletes the device setting task in process for rescheduling. The task control unit 413 then advances the processing to step S16409.

If the setting processing pre-start job wait maximum waiting time 707 is determined to have elapsed during the pre-start wait in step S16402 ("WAITING TIME HAS ELAPSED" in step S16402) or if the final execution time Ts of the power-off task is determined to come first in step S16404 ("Ts COMES FIRST" in step S16404), the task control unit 413 also advances the processing to step S16409.

In step S16409, the task control unit 413 performs the power-off task processing [2]. Exiting from the power-off task processing [2], the task control unit 413 exits from the device setting task processing [2] and advances the processing to the next step according to the processing procedure of the calling source.

Next, the device setting task processing [3] will be described.

FIG. 16F is a flowchart illustrating the device setting task processing [3] of the task control unit 413. The processing of this flowchart is implemented by the CPU inside the controller 202 executing a program stored in the internal ROM.

In step S16501 of the device setting task processing [3], the task control unit 413 initially performs a pre-start wait. In this step, the task control unit 413 waits until the setting processing pre-start job wait maximum waiting time 707 of the device setting task in process has elapsed or until there becomes no remaining job in the meantime. That the setting processing pre-start job wait maximum waiting time 707 has elapsed refers to the lapse of the setting processing pre-start job wait maximum waiting time 707 since the start time 702 of the device setting task in process.

If there is determined to be no remaining job during the pre-start wait in step S16501 ("THERE IS NO REMAINING JOB" in step S16501), the task control unit 413 advances the processing to step S16402.

In step S16402, the task control unit 413 executes device setting. To execute the device setting, the task control unit 413 initially causes the device setting value acquisition module 432 to acquire the device setting value file. By using the acquired device setting value file, the task control unit 413 then causes the device setting execution module 433 to execute device setting. The task control unit 413 then advances the processing to step S16503.

In step S16503, the task control unit 413 compares the final execution time Ts of the power-off task with the restart completion expected final time Tr.

If the restart completion expected final time Tr is determined to come first ("Tr COMES FIRST" in step S16503), the task control unit 413 determines that a restart will be completed first, and advances the processing to step S16504.

In step S16504, the task control unit 413 reschedules the power-off task so that the power-off task will be executed at next startup time, and advances the processing to step S16505.

In step S16505, the task control unit 413 performs a pre-restart wait. In the pre-restart wait, the task control unit 413 waits until there is no remaining job or until the pre-restart job wait maximum waiting time 708 has elapsed. When there is no remaining job or the pre-restart job wait maximum waiting time 708 has elapsed, the task control unit 413 advances the processing to step S16506.

In step S16506, the task control unit 413 instructs the restart execution module 434 to restart. After the completion of the instruction, the task control unit 413 exits from the device setting task processing [3] and advances the processing to the next step according to the processing procedure of the calling source.

If the setting processing pre-start job wait maximum waiting time 707 is determined to have elapsed during the pre-start wait in step S16501 ("WAITING TIME HAS ELAPSED" in step S16501) or if the final execution time Ts of the power-off task is determined to come first in step S16503 ("Ts COMES FIRST" in step S16503), the task control unit 413 advances the processing to step S16507.

In step S16507, the task control unit 413 performs the power-off task processing [2]. Exiting from the power-off task processing [2], the task control unit 413 exits from the device setting task processing [3] and advances the processing to the next step according to the processing procedure of the calling source.

Next, the reboot processing [1] will be described.

FIG. 16G is a flowchart illustrating the reboot processing [1] of the task control unit 413. The processing of this flowchart is implemented by the CPU inside the controller 202 executing a program stored in the internal ROM.

In step S16601 of the reboot processing [1], the task control unit 413 initially performs a pre-start wait. In this step, the task control unit 413 waits until time has elapsed as much as the setting processing pre-start job wait maximum waiting time 707 of the device setting task in process, until there becomes no remaining job in the meantime, or until a new power-off task is issued in the meantime. That the setting processing pre-start job wait maximum waiting time 707 has elapsed refers to the lapse of the setting processing pre-start job wait maximum waiting time 707 since the start time 702 of the device setting task in process.

If a new power-off task is determined to be issued during the pre-start wait in step S16601 ("THERE IS NEW POWER-OFF TASK" in step S16601), the task control unit 413 advances the processing to step S16602.

In step S16602, the task control unit 413 compares the final execution time Ts of the power-off task with the restart completion expected final time Tr.

If Tr is determined to come first ("Tr COMES FIRST" in step S16602), the task control unit 413 determines that a restart will be completed first, and advances the processing to step S16603.

In step S16603, the task control unit 413 reschedules the power-off task so that the power-off task will be performed at next startup time, and advances the processing to step S16604.

In step S16604, the task control unit 413 performs a pre-restart wait. In the pre-restart wait in step S16604, the task control unit 413 waits until there is no remaining job or until the pre-restart job wait maximum waiting time 708 has elapsed. When there is no remaining job or the pre-restart job wait maximum waiting time 708 has elapsed, the task control unit 413 advances the processing to step S16605.

In step S16605, the task control unit 413 instructs the restart execution module 434 to restart. After the completion of the restart instruction, the task control unit 413 exits from the reboot processing [1] and advances the processing to the next step according to the processing procedure of the calling source.

If, in step S16601, there is determined to be no remaining job or the pre-restart job wait maximum waiting time 708 is determined to have elapsed ("THERE IS NO REMAINING JOB OR WAITING TIME HAS ELAPSED" in step S16601), the task control unit 413 advances the processing to step S16606.

If, in step S16602, Ts is determined to come first ("Ts COMES FIRST" in step S16602), the task control unit 413 advances the processing to step S16606.

In step S16606, the task control unit 413 performs the power-off task processing [2]. Exiting from the power-off task processing [2], the task control unit 413 exits from the reboot processing [1] and advances the processing to the next step according to the processing procedure of the calling source.

As has been described above, according to the first exemplary embodiment, device setting and a power-off can be properly performed even if the device setting, an accompanying restart, and the power-off are instructed to be immediately executed or scheduled in an overlapping manner. In particular, a power-off is prevented from being left undone against the user's intention at a time when the power-off is supposed to have surely been performed. This can prevent a device failure from occurring even if an external power supply is disconnected.

In the present exemplary embodiment, the processing of the power-off task providing unit 414 (first designation processing) is configured to designate a power-off task of shutting down the image forming apparatus 102 within a designated period. The processing of the device setting task providing unit 415 (second designation processing) is configured to designate a device setting task of executing a setting process for setting a setting item of the image forming apparatus 102 within a designated period and a restart process for restarting the image forming apparatus 102 after the setting process. If a power-off task is designated, the task control unit 413 performs control to change the processing according to which of a plurality of phases (a pre-start wait, execution of device setting, a pre-restart wait, execution of a restart, and a device startup) of the device setting task the final execution time Ts of the power-off task (i.e., the end of the user-designated period, or the final time when the power-off is allowed) comes in.

For example, if the final execution time Ts (the end of the designated period) of the power-off task falls between the start time 702 of the device setting task and the device setting processing completion expected final time Tcomp (between a pre-start wait and the completion of the execution of the device setting, i.e., within a period between the beginning of the designated period of the device setting task and a date and time when the setting process is estimated to be completed), the task control unit 413 performs control to once cancel the device setting task, reschedule the device setting task so that the device setting task will be executed at next startup time, and execute the power-off task.

If the final execution time Ts (the end of the designated period) of the power-off task falls between immediately after the device setting processing completion expected final time Tcomp of the device setting task and the restart completion expected final time Tr (between immediately after the completion of the execution of the device setting and the completion of a device startup, i.e., within a period between the date and time when the setting process is estimated to be completed and a date and time when the MFP 102 restarted by the restart process is estimated to complete being restarted), the task control unit 413 performs control to execute the device setting included in the device setting task, cancel processing subsequent to the pre-restart wait, and execute the power-off task. In other words, the task control unit 413 performs control to cancel the execution of the restart included in the device setting task, and execute the power-off task.

If the final execution time Ts (the end of the designated period) of the power-of task comes after the restart completion expected final time Tr of the device setting task (after the completion of a device restart, i.e., if the final execution time Ts comes after a date and time when the MFP 102 restarted by the restart process of the setting task is estimated to complete being restarted), the task control unit 413 performs the device setting included in the device setting task, once cancels the power-off task, reschedules the power-off task so that the power-off task will be executed at next startup time, and performs the processing subsequent to the pre-restart wait of the device setting task.

According to the first exemplary embodiment, proper processing can be performed even if device setting, an accompanying restart, and a power-off are instructed in an overlapping manner. Now, suppose that the execution of a restart included in a device setting task is canceled in order to execute a power-off task, and then the power-off task is canceled. In such a case, the device setting can be left unapplied.

Examples include a case where the forced off flag 504 is off and a job still remains even after the lapse of the job wait maximum waiting time 503. Another example is a case where a power-off task is configured to be able to be canceled by a predetermined user (administrator) and the power-off task is canceled.

A power-off can thus be left undone even if the execution of a restart subsequent to device setting is canceled. In such cases, the result of execution of the device setting that is supposed to be applied to the device is left unapplied due to the absence of the restart.

In a second exemplary embodiment, the MFP 102 includes a function of notifying the administrator of an event occurring in the device (MFP 102). The MFP 102 is configured to make a notification to the administrator in the event that the device is left without a restart.

The second exemplary embodiment will be described below only in terms of differences from the first exemplary embodiment. Omitted details are similar to those of the first exemplary embodiment.

Network device management software according to the second exemplary embodiment will initially be described with reference to FIG. 20.

Figure 20:
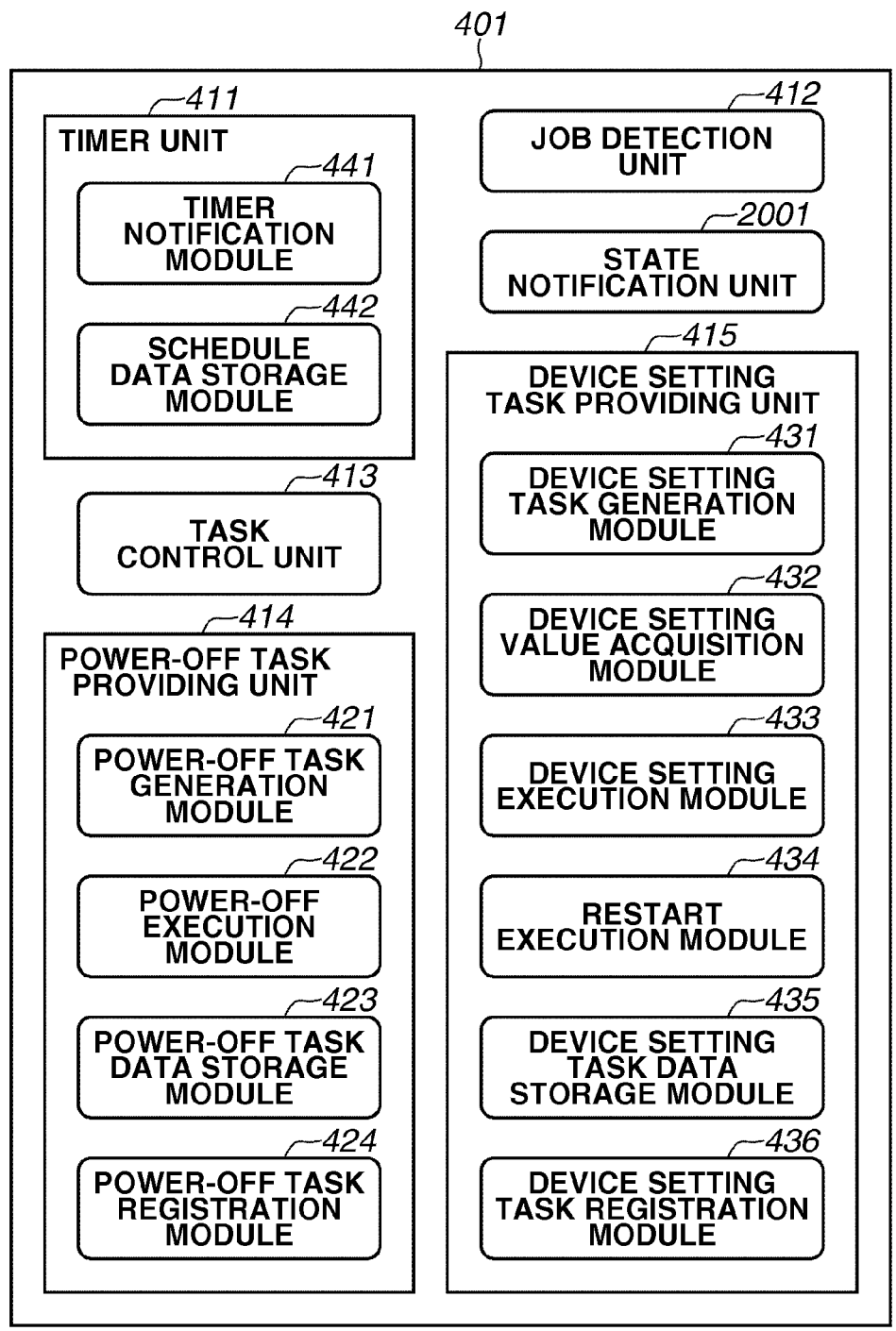
FIG. 20 is a block diagram illustrating an example of an internal configuration of network device management software according to the second exemplary embodiment.

FIG. 20 is a block diagram illustrating an example of an internal configuration of the network device management software according to the second exemplary embodiment.

The units and modules 401 to 442 illustrated in FIG. 20 are similar to those illustrated in FIG. 4. A description thereof is omitted.

A state notification unit 2001 makes a notification to the administrator when an event to be notified to the administrator occurs in the network device management system. For example, if restart processing of a device setting task is canceled due to the presence of a power-off task and then the power-off task is canceled, the state notification unit 2001 transmits the event to the information processing apparatus 103 of the administrator to notify the administrator of the cancellation of the power-off task. The state notification unit 2001 is configured to make the notification to a notification designation (such as an e-mail address) of the administrator by using a notification unit such as e-mail. The notification destination (such as an e-mail address) of the administrator is stored in a storage device such as the storage 203 of the MFP 102 in advance.

Next, a configuration for the administrator to cancel a power-off task will be described with reference to FIG. 17.

Figure 17:
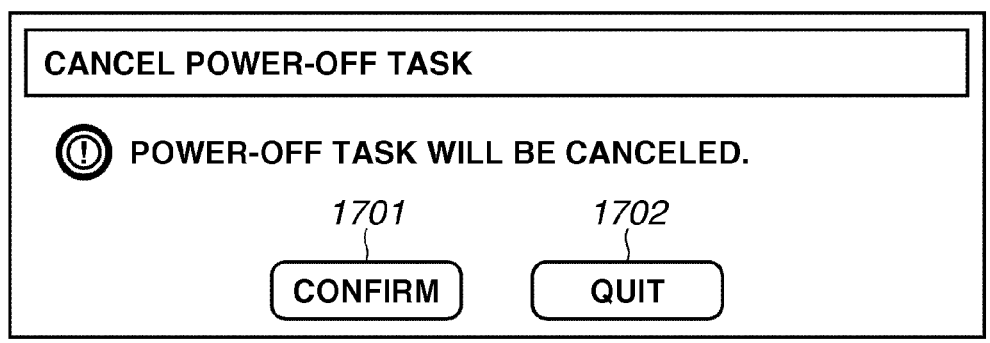
FIG. 17 is a diagram schematically illustrating a power-off task cancel screen which the task control unit displays on a web browser running on the information processing apparatus via the network by using a servlet and from which the administrator can cancel a power-off task.

FIG. 17 is a diagram schematically illustrating a power-off task cancel screen which the task control unit 413 displays on a web browser running on the information processing apparatus 103 via the network 101 by using a servlet and from which the administrator can cancel a power-off task.

In FIG. 17, the power-off task cancel screen includes a confirm button 1701 for the cancellation of a power-off task and a quit button 1702 for the cancellation of a power-off task.

Receiving a request to cancel a power-off task from the information processing apparatus 103, the task control unit 413 generates and transmits the power-off task cancel button (FIG. 17) to the information processing apparatus 103.

A web browser is running on the information processing apparatus 103. The information processing apparatus 103 displays the power-off task cancel screen (FIG. 17) on the web browser. When the administrator makes a pressing operation on the confirm button 1701 or the quit button 1702, the information processing apparatus 103 transmits operation information to the task control unit 413.

The task control unit 413 receives the operation information transmitted from the information processing apparatus 103, and examines the operation information. If the operation information indicates a pressing operation on the confirm button 171, the task control unit 413 cancels the power-off task. On the other hand, if the operation information indicates a pressing operation on the quit button 1702, the task control unit 413 will not cancel the power-off task.

Next, power-off task processing [2] according to the second exemplary embodiment will be described with reference to FIG. 18. As mentioned above, the rest of the task processing of the task control unit 413 is similar to that of the first exemplary embodiment. A description thereof is omitted.

Figure 18:
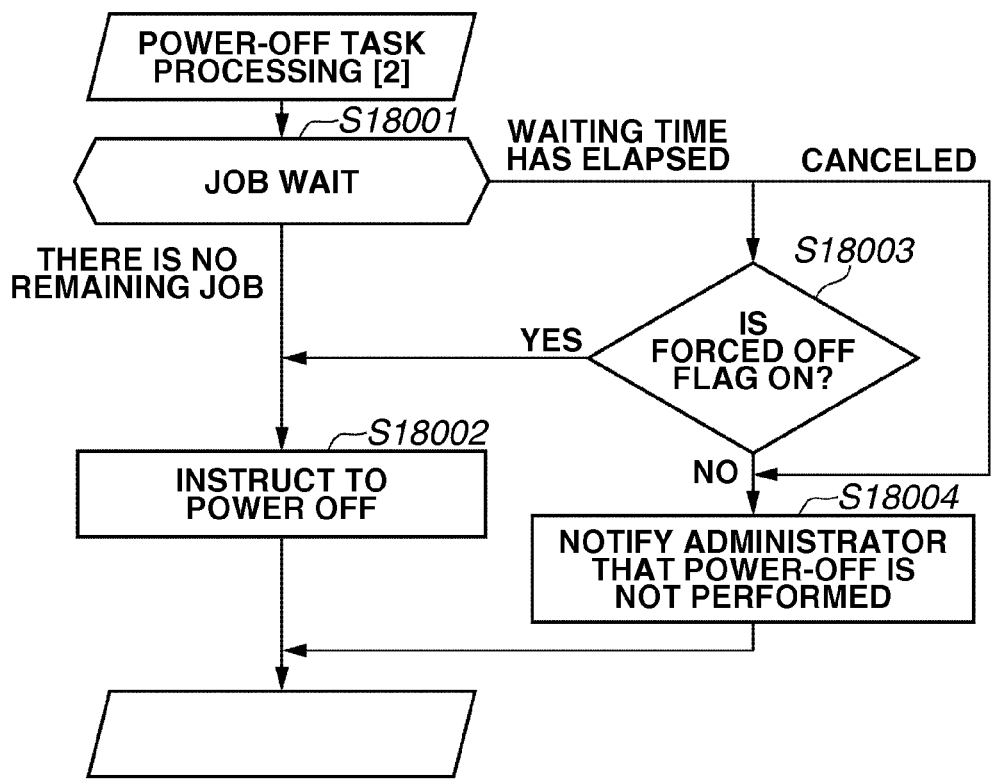
FIG. 18 is a flowchart illustrating power-off task processing [2] of the task control unit according to a second exemplary embodiment.

FIG. 18 is a flowchart illustrating the power-off task processing [2] of the task control unit 413 according to the second exemplary embodiment. The processing of this flowchart is implemented by the CPU inside the controller 202 executing a program stored in the internal ROM.

In step S18001 of the power-off task processing [2] according to the second exemplary embodiment, the task control unit 413 initially performs a job wait. In this step, the task control unit 413 waits until the job wait maximum waiting time 503 of the task data on the power-off task currently in process has elapsed, until there becomes no remaining job in the meantime, or until the power-off task is canceled in the meantime. The lapse of the job wait maximum waiting time 503 refers to the lapse of the job wait maximum waiting time 503 since the start time 502 of the power-off task currently in process.

If there is determined to be no remaining job during the job wait in step S18001 ("THERE IS NO REMAINING JOB" in step S18001), the task control unit 413 advances the processing to step S18002. The processing in step S18002 is similar to that in step S16302 in FIG. 16D. A description thereof is omitted.

If the job wait maximum waiting time 503 is determined to have elapsed during the job wait in step S18001 ("WAITING TIME HAS ELAPSED" in step S18001), the task control unit 413 advances the processing to step S18003.

In step S18003, the task control unit 413 check whether the forced off flag 504 is on. If the forced off flag 504 is determined to be on (YES in step S18003), the task control unit 413 determines that the power-off task is instructed to be forcibly executed, and advances the processing to step S18002.

On the other hand, if the forced off flag 504 is determined not to be on (NO in step S18003), the task control unit 413 determines that the power-off task is not instructed to be forcibly executed, and advances the processing to step S18004.

If the power-off task is determined to be canceled during the job wait in step S18001 ("CANCELED" in step S18001), the task control unit 413 advances the processing to step S18004.

In step S18004, the task control unit 413 notifies the administrator via the state notification unit 2001 that the processing of the task has ended without a power-off. After the completion of the notification in step S18004, the task control unit 413 exits from the power-off task processing [2] and advances the processing to the next step according to the processing procedure of the calling source.

As has been described above, according to the second exemplary embodiment, proper processing can be performed even if a restart that accompanies device setting is initially canceled due to the presence of a power-off task and then the power-off task is canceled.

More specifically, if the forced off flag 504 is set so that the power-off task does not force a power-off, or if the administrator cancels the power-off task afterwards and the MFP 102 remains powered on, a notification is made to the administrator.

With such a configuration, the administrator can manually restart the device (MFP 102) without delay, whereby the device setting is promptly and properly applied to the device and becomes usable.

The task control unit 413 may also be configured to make a notification to the administrator via the state notification unit 2001 in the following cases.

For example, the task control unit 413 may be configured, if the determination in step S16105 of FIG. 16B is NO, to notify the administrator that the power-off will not be executed.

The task control unit 413 may be configured, if the determination in step S16201 of FIG. 16C is "WAITING TIME HAS ELAPSED," to notify the user that the device setting will not be executed.

The task control unit 413 may be configured, if the setting processing pre-start job maximum waiting time 707 is determined to have elapsed during the pre-start wait in step S16501 of FIG. 16F, to notify the administrator that the device setting will not be executed.

The task control unit 413 may be configured, if device setting is executed, to notify the administrator of the execution.

The task control unit 413 may also be configured, if processing is not performed as set by the administrator like when device setting is not executed due to job execution, to notify the administrator of the failed execution.

The task control unit 413 may be configured to make a notification to the administrator immediately before a power-off is executed, or immediately before or immediately after a restart is executed.

With such a configuration, the administrator can immediately comprehend the state of the device (MFP 102) and facilitate management and/or promptly take necessary measures.

In the foregoing second exemplary embodiment, the task control unit 413 is configured to make a notification to the administrator and thereby prompt the administrator to restart the device if a restart that accompanies device setting is initially canceled due to the presence of a power-off task and then the power off-task is canceled. In a third exemplary embodiment, the task control unit 413 is configured to automatically execute a restart in such a case.

The third exemplary embodiment will be described below only in terms of differences from the second exemplary embodiment. Omitted details are similar to those of the second exemplary embodiment.

Power-off task processing [2] according to the third exemplary embodiment will be described with reference to FIG. 19. As mentioned above, the rest of the task processing of the task control unit 413 is similar to that of the first exemplary embodiment. A description thereof is omitted.

Figure 19:
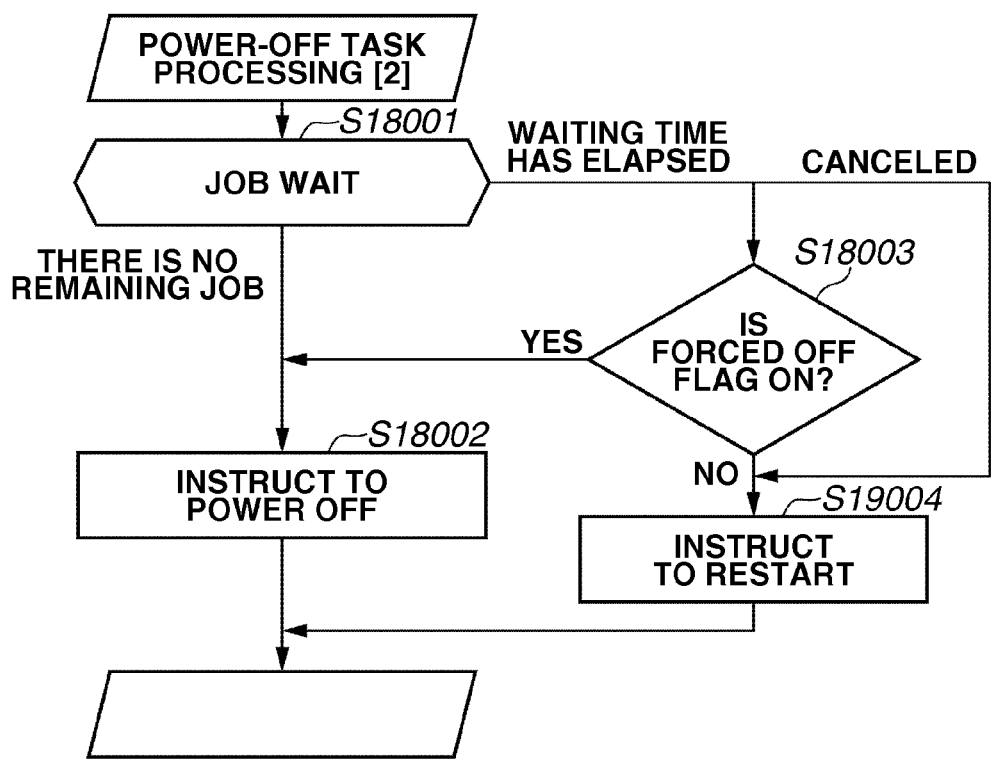
FIG. 19 is a flowchart illustrating power-off task processing [2] of the task control unit according to a third exemplary embodiment.

FIG. 19 is a flowchart illustrating the power-off task processing [2] of the task control unit 413 according to the third exemplary embodiment. The processing of this flowchart is implemented by the CPU inside the controller 202 executing a program stored in the internal ROM. Similar steps to those of FIG. 18 are designated by the same step numbers. The following description deals only with differences from FIG. 18.

If, in step S18003, the forced off flag 504 is determined not to be on (NO in step S18003), the task control unit 413 determines that the power-off task is not instructed to be forcibly executed. After the end of the processing of the waited job, the task control unit 413 advances the processing to step S19004.

If the power-off task is determined to be canceled during the job wait in step S18001 ("CANCELED" in step S18001), the task control unit 413 also advances the processing to step S19004.

In step S19004, the task control unit 413 instructs the restart execution module 434 to restart. After the completion of the instruction, the task control unit 413 exits from the power-off task processing [2] and advances the processing to the next step according to the processing procedure of the calling source.

As described above, according to the third exemplary embodiment, proper processing can be performed even if a restart that accompanies device setting is initially canceled due to the presence of a power-off task and then the power-off task is canceled.

More specifically, if the forced off flag 504 is set so that the power-off task does not force a power-off, or if the administrator cancels the power-off task afterwards and the MFP 102 remains powered on, a proper restart is performed anew, whereby the device setting is properly applied and becomes usable.

In the foregoing second exemplary embodiment, the administrator needs to receive a notification and manually restart the device. One of the advantages of the third exemplary embodiment is that such an operation is not needed.

The third exemplary embodiment may include the state notification unit 2001 illustrated in FIG. 20. Like the second exemplary embodiment, the task control unit 413 may be configured to make a notification to the administrator via the state notification unit 2001.

For example, the task control unit 413 may be configured, if a restart is executed in step S19004 of FIG. 19, to notify the administrator of the execution of the restart.

The task control unit 413 may also be configured to make a notification to the administrator in various other cases described in the last paragraphs of the second exemplary embodiment.

With such a configuration, the administrator can immediately comprehend the state of the device (MFP 102) and facilitate management and/or promptly take necessary measures.

In the foregoing first to third exemplary embodiments, the task control unit 413 is configured, if the final execution time Ts of a power-off task comes before the device setting processing completion expected final time Tcomp, to always execute a device setting task at next startup time. In such a case, the device setting task will be completed and the setting will be applied later than expected. A higher priority may be given to the execution of the device setting task. However, the final execution time Ts of the power-off task will elapse while the device setting execution module 433 is executing the device setting, which can make the power-off not possible to execute.

In view of the foregoing, in a fourth exemplary embodiment, the task control unit 413 is configured to maximize the possibility of execution of both a device setting task and a power-off task even if the final execution time Ts of the power-off task is set to come during the execution of the device setting execution module 433.

The fourth exemplary embodiment will be described below only in terms of differences from the first to third exemplary embodiment. Omitted details are similar to those of the first to third exemplary embodiments.

Power-off task data according to the fourth exemplary embodiment will initially be described with reference to FIG. 22.

Figure 22:
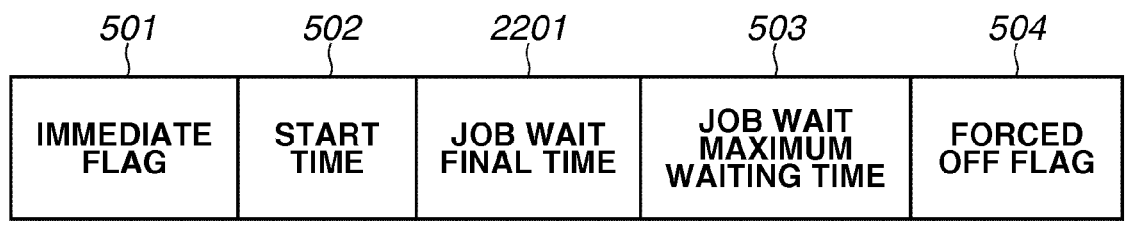
FIG. 22 is a diagram schematically illustrating a data configuration of power-off task data according to the fourth exemplary embodiment.

FIG. 22 is a diagram schematically illustrating a data configuration of the power-off task data according to the fourth exemplary embodiment.

In FIG. 22, the flags and times 501 to 504 are similar to those of FIG. 5. A description thereof is omitted. The power-off task data also includes a job wait final time 2201.

The job wait final time 2201 is calculated by the power-off task generation module 421. In step S1008 of FIG. 10, the power-off task generation module 421, while generating power-off task data, calculates the job wait final time 2201 by the following method. If the immediate flag 501 indicates that the power-off task is to be "executed according to a schedule," the power-off task generation module 421 calculates the job wait final time 2201 by adding the job wait maximum waiting time 503 to the start time 502. If the immediate flag 501 indicates that the power-off task is to be "immediately executed," the power-off task generation module 421 calculates the job wait final time 2201 by adding the job wait maximum waiting time 503 to the current time.

Next, device setting task processing [2] according to the fourth exemplary embodiment will be described with reference to FIG. 21A. Reboot processing [1] according to the fourth exemplary embodiment will be described with reference to FIG. 21B. As mentioned above, the rest of the task processing of the task control unit 413 is similar to that of any of the first to third exemplary embodiments. A description thereof is omitted.

Figure 21A:
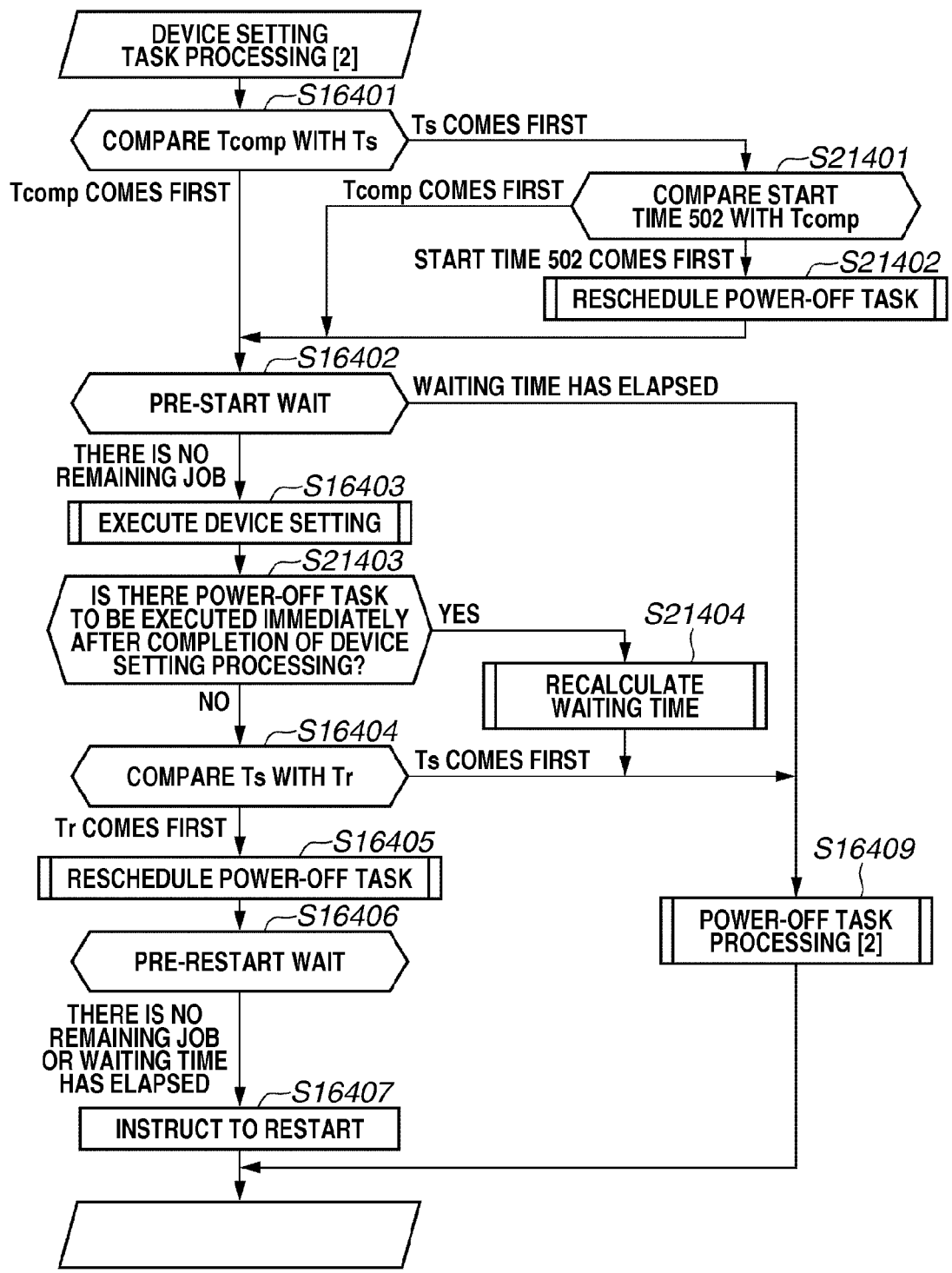
FIG. 21A is a flowchart illustrating device setting task processing [2] of the task control unit according to a fourth exemplary embodiment.

FIG. 21A is a flowchart illustrating the device setting task processing [2] of the task control unit 413 according to the fourth exemplary embodiment. The processing of this flowchart is implemented by the CPU inside the controller 202 executing a program stored in the internal ROM. Similar steps to those of FIG. 16E are designated by the same step numbers. The following description deals only with differences from FIG. 16E.

In step S16401 of the device setting task processing [2] according to the fourth exemplary embodiment, the task control unit 413 compares the device setting processing completion expected final time Tcomp of the device setting task currently in process with the final execution time Ts of the power-off task at a near time. If the final execution time Ts of the power-off task is determined to come before the device setting processing completion expected final time Tcomp ("Ts COMES FIRST" in step S16401), the task control unit 413 advances the processing to step S21401.

In step S21401, the task control unit 413 compares the start time 502 of the power-off task with Tcomp.

If the start time 502 is determined to come after Tcomp ("Tcomp COMES FIRST" in step S21401), the task control unit 413 simply advances the processing to step S16402.

On the other hand, if the start time 502 is determined to come before Tcomp ("START TIME 502 COMES FIRST" in step S21401), the task control unit 413 advances the processing to step S21402. In step S21402, the task control unit 413 reschedules the power-off task. More specifically, the task control unit 413 generates and registers power-off task data in which the start time 502 is set to "88:88" which represents that the power-off task is to be executed immediately after the completion of device setting processing. The task control unit 413 then deletes the former power-off task data for rescheduling. After the completion of the rescheduling, the task control unit 413 advances the processing to step S16402.

In step S16403, the task control unit 413 completes the device setting, and advances the processing to step S21403.

In step S21403, the task control unit 413 check whether there is a power-off task designated for a start time "88:88." The task control unit 413 thereby determines whether there is a power-off task to be executed immediately after the completion of the device setting processing.

If there is no power-off task designated for the start time "88:88," the task control unit 413 determines that there is no power-off task to be executed immediately after the completion of the device setting processing (NO in step S21403). The task control unit 413 advances the processing to step S16404.

On the other hand, if there is a power-off task designated for the start time "88:88," the task control unit 413 determines that there is a power-off task to be executed immediately after the completion of the device setting processing (YES in step S21403). The task control unit 413 advances the processing to step S21404.

In step S21404, the task control unit 413 recalculates waiting time. If the current time has passed the final execution time Ts (i.e., the job wait final time 2201) of the original power-off task, the task control unit 413 sets the current time into the start time 502 and "0" into the job wait maximum waiting time 503 to make the waiting time zero. On the other hand, if the current time has not yet passed the final execution time Ts (job wait final time 2201) of the original power-off task, the task control unit 413 sets the current time into the start time 502 and a difference between Ts and the current time into the job wait maximum waiting time 503, thereby setting the waiting time to the difference between Ts and the current time. After the completion of the recalculation of the waiting time, the task control unit 413 advances the processing to step S16409. Other steps are similar to those of FIG. 16E. A description thereof is omitted.

Figure 21B:
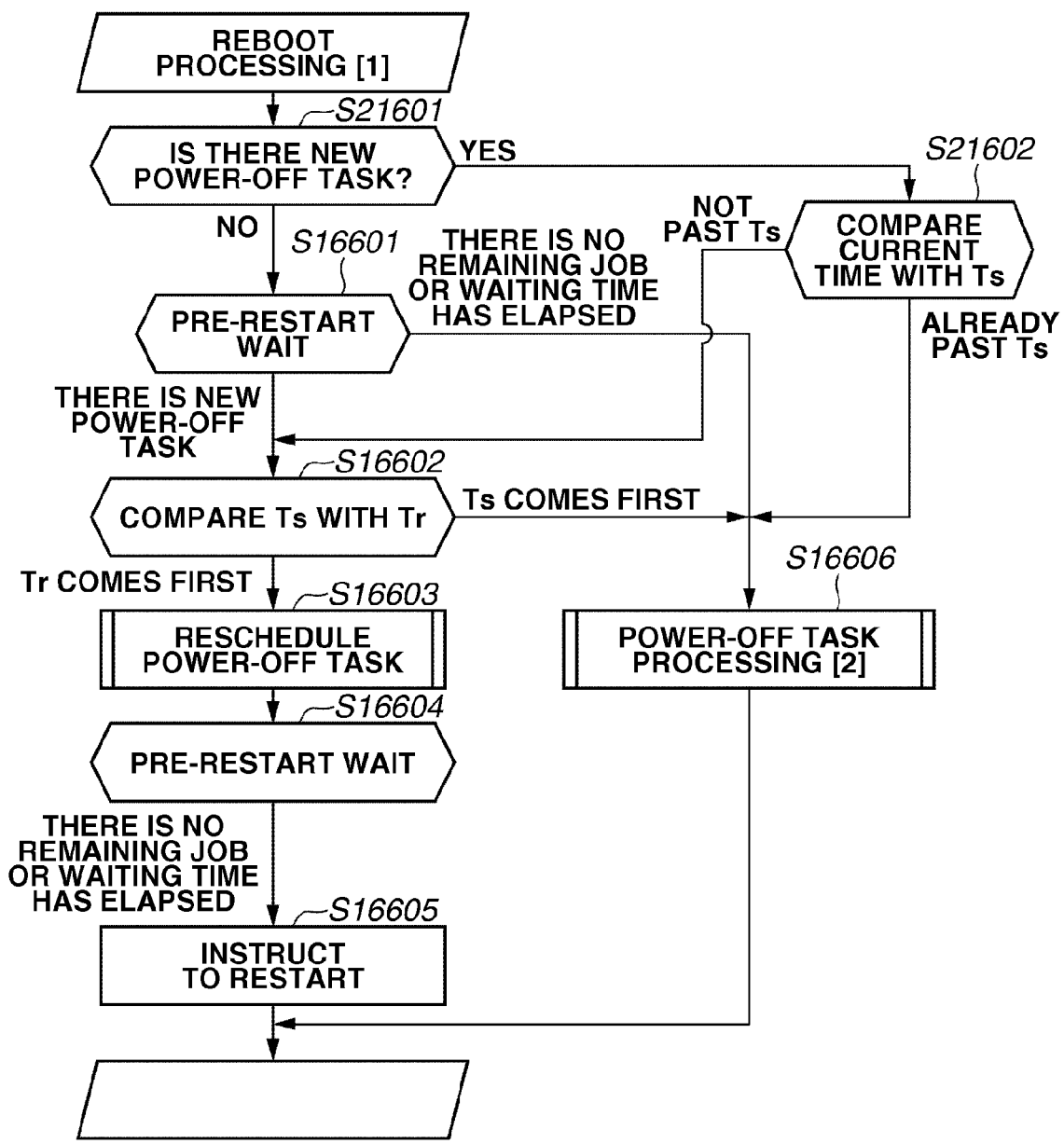
FIG. 21B is a flowchart illustrating reboot processing [1] of the task control unit according to the fourth exemplary embodiment.

FIG. 21B is a flowchart illustrating the reboot processing [1] of the task control unit 413 according to the fourth exemplary embodiment. The processing of this flowchart is implemented by the CPU inside the controller 202 executing a program stored in the internal ROM. Similar steps to those of FIG. 16G are designated by the same step numbers. The following description deals only with differences from FIG. 16G.

In the step S21601 of the reboot processing [1] according to the fourth exemplary embodiment, the task control unit 413 initially checks whether there is a new power-off task.

If there is determined to be a new power-off task (YES in step S21601), the task control unit 413 advances the processing to step S21602.

In step S21602, the task control unit 413 compares the current time with the final execution time Ts of the power-off task.

If the current time is determined not to have passed Ts yet ("NOT PAST Ts" in step S21602), the task control unit 413 advances the processing to step S16602.

On the other hand, if the current time is determined to have already passed Ts ("ALREADY PAST Ts" in step S21602), the task control unit 413 advances the processing to step S16606.

As has been described above, there are cases where the final execution time Ts of a power-off task comes between the start of device setting processing of a device setting task and the device setting processing completion expected final time Tcomp. In such cases, according to the foregoing first to third exemplary embodiments, the entire device setting task is canceled and will be executed at next startup time. This can cause a considerable delay of the time when the device setting task is eventually executed. According to the fourth exemplary embodiment, even in such cases, the device setting based on the device setting task can be executed at an initially intended time where possible, along with a power-off.

The reboot processing [1] includes two separate steps "pre-restart wait" and "instruct to restart." According to the first to third exemplary embodiments, the task control unit 413 initially enters a "pre-restart wait" before checking for the presence of a new power-off task. According to the fourth exemplary embodiment, the task control unit 413 is configured, if there is a new power-off task that is issued during the "device setting processing" immediately before the reboot processing [1] and reaches the final execution time Ts, to process the power-off task by priority.

As has been described above, according to the first and third exemplary embodiments, if the device setting processing completion expected final time Tcomp of a device setting task comes after the final execution time Ts of a power-off task, the "device setting processing" is always executed after a restart. This can increase the possibility that the device setting takes effect later than expected by the administrator. According to the fourth exemplary embodiment, the task control unit 413 is configured to reschedule a power-off task so that the power-off task will be executed immediately after the setting process of a device setting task, and execute the setting process of the device setting task even if the end (Ts) of the designated period of the power-off task falls within a period between the beginning of the designated period of the device setting task and the date and time (Tcomp) when the setting process is estimated to be completed, provided that the beginning (start time 502) of the designated period of the power-off task comes before the date and time (Tcomp) when the setting process of the device setting task is estimated to be completed. This creates a situation where the device setting processing can be executed even in the foregoing case. As compared to the first to third exemplary embodiments, the device setting processing can be executed more often. Consequently, as compared to the first to third exemplary embodiments, device setting can be performed at a time expected by the administrator more often.

In an actual system, an external power supply may be disconnected while device setting based on a device setting task is in operation. In such a case, the administrator can generate a power-off task in consideration of the time when the power supply may be disconnected. However, the administrator may sometimes be unaware that a device setting task would start device setting processing at the same time.

A fifth exemplary embodiment deals with a configuration that can avoid such a situation by imposing limitations on the generation of a power-off task in the foregoing case.

The fifth exemplary embodiment will be described below with reference to the drawings. The following description deals only with differences from the first to fourth exemplary embodiments. Omitted details are similar to those of any of the first to fourth exemplary embodiments.

Power-off task generation processing according to the fifth exemplary embodiment will initially be described with reference to the flowchart of FIG. 24.

Figure 24:
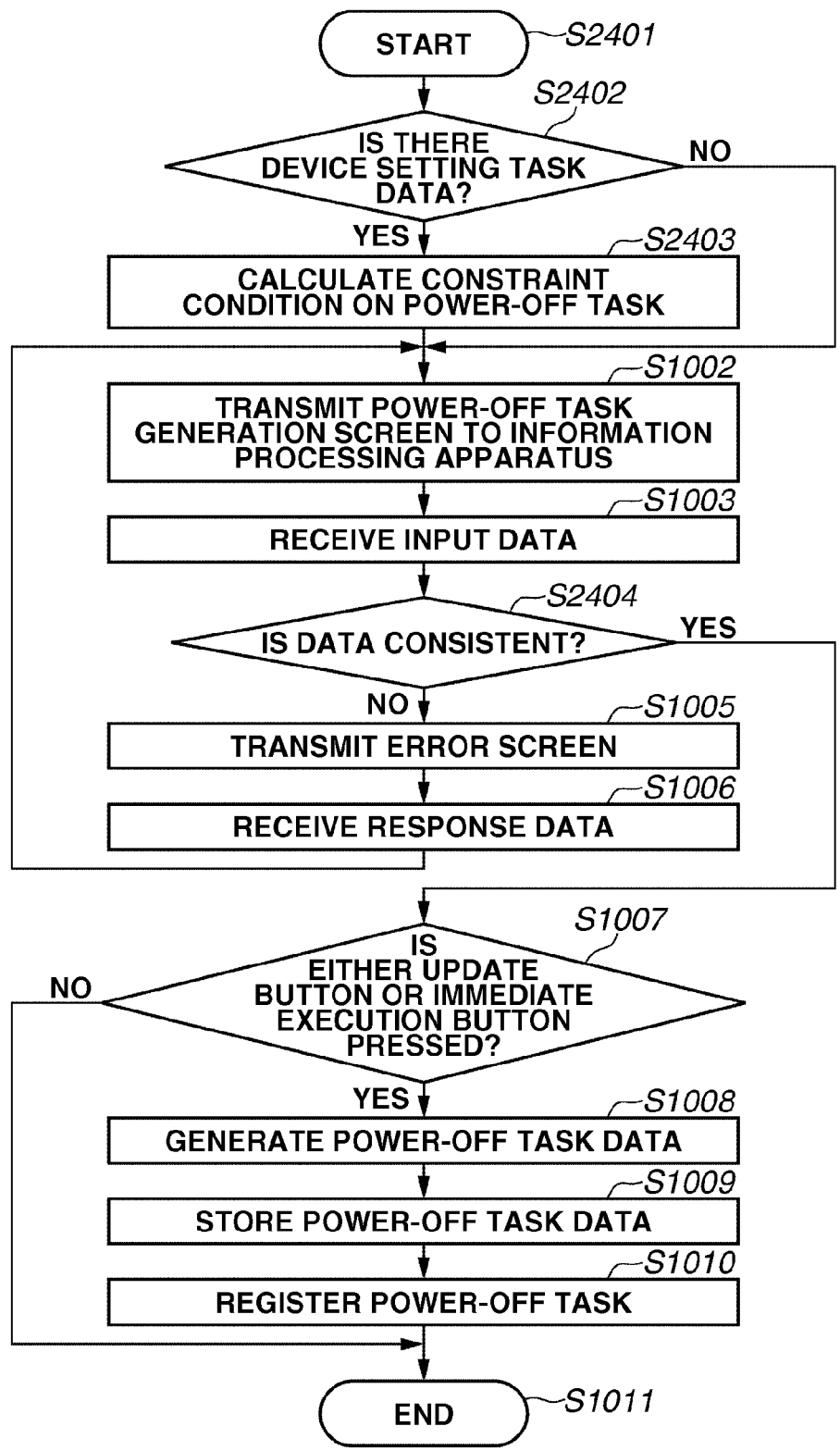
FIG. 24 is a flowchart illustrating an example of a procedure by which a power-off task generation module according to a fifth exemplary embodiment generates a power-off task.

FIG. 24 is a flowchart illustrating an example of a procedure by which the power-off task generation module 421 according to the fifth exemplary embodiment generates a power-off task. The processing of this flowchart is implemented by the CPU inside the controller 202 executing a program stored in the internal ROM. Similar steps to those of FIG. 10 are designated by the same step numbers. The following description deals only with differences from FIG. 10.

The power-off task generation module 421 initially receives a request to generate a power-off task from the information processing apparatus 103. In step S2401, the power-off task generation module 421 starts the processing.

In step S2402, the power-off task generation module 421 determines whether there is device setting task data.

If there is determined to be no device setting task data (NO in step S2402), the power-off task generation module 421 advances the processing to step S1002.

If there is determined to be device setting task data (YES in step S2402), the power-off task generation module 421 advances the processing to step S2403.

In step S2403, the power-off task generation module 421 calculates a constraint condition on a power-off task. More specifically, the power-off task generation module 421 calculates a constraint condition that inhibits the generation of a power-off task whose final execution time Ts reaches or exceeds the device setting processing completion expected final time Tcomp. The power-off task generation module 421 then advances the processing to step S1002.

In step S2404, the power-off task generation module 421 performs data consistency check processing. Here, the power-off task generation module 421 verifies data consistency as in step S1004 of FIG. 10. The power-off task generation module 421 also determines data to be inconsistent if the data is operable to generate a power-off task that interferes with the foregoing constraint condition. The rest of the processing is similar to that illustrated in FIG. 10. A description thereof is omitted.

A power-off task generation screen according to the fifth exemplary embodiment will be described below with reference to FIG. 25.

Figure 25:
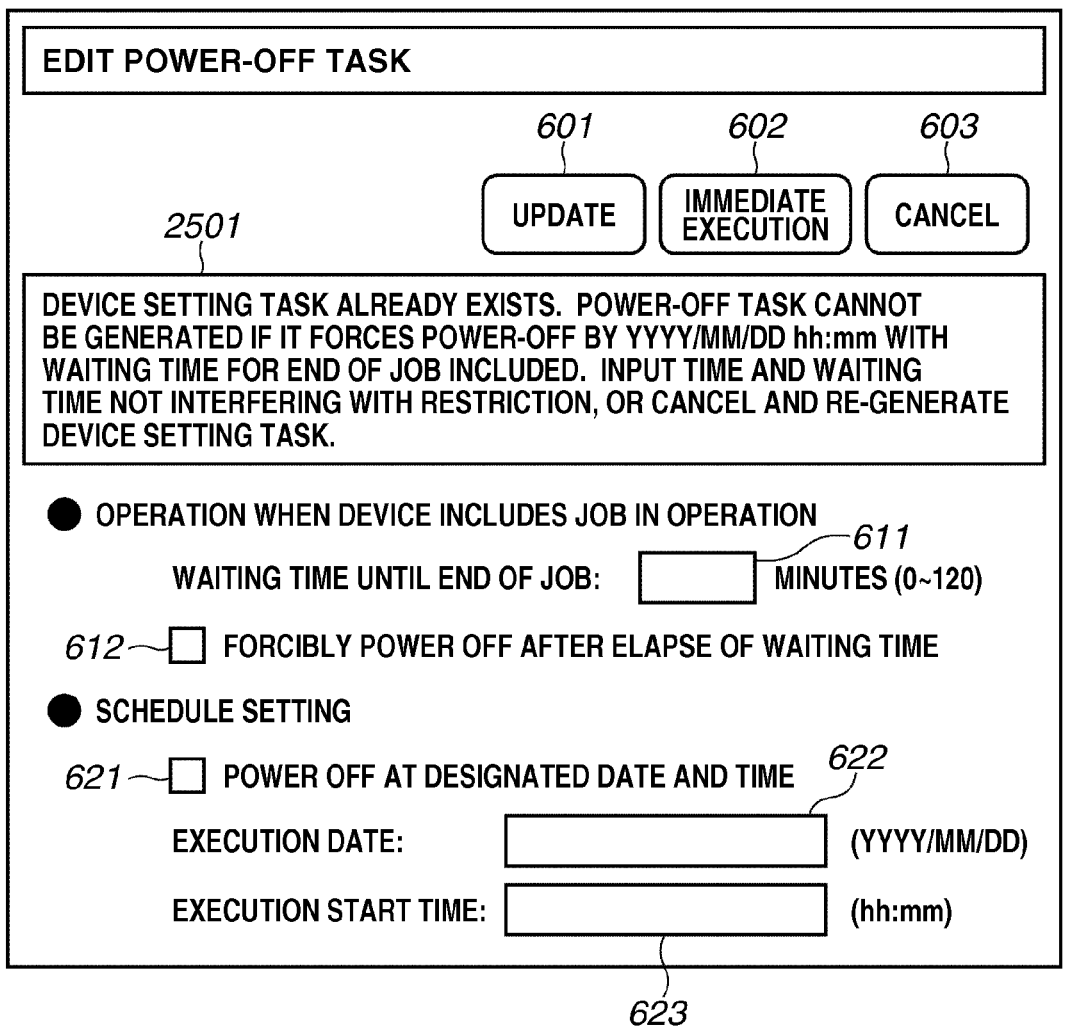
FIG. 25 is a diagram schematically illustrating a power-off task generation screen which the power-off task generation module according to the fifth exemplary embodiment displays on a web browser running on the information processing apparatus via the network by using a servlet and from which the administrator can generate a power-off task.

FIG. 25 is a diagram schematically illustrating the power-off task generation screen which the power-off task generation module 421 according to the fifth exemplary embodiment displays on a web browser running on the information processing apparatus 103 via the network 101 by using a servlet and from which the administrator can generate a power-off task. Similar items to those of FIG. 6 are designated by the same reference numerals. The following description deals only with differences from FIG. 6.

In FIG. 25, the power-off task generation screen includes a message 2501 to be presented to the administrator about the foregoing constraint condition. The message 2501 will not be displayed if there is no device setting task. Without a device setting task, the power-off task generation screen is the same as that illustrated in FIG. 6.

Next, a configuration for the administrator to cancel a device setting task will be described with reference to FIG. 23.

Figure 23:
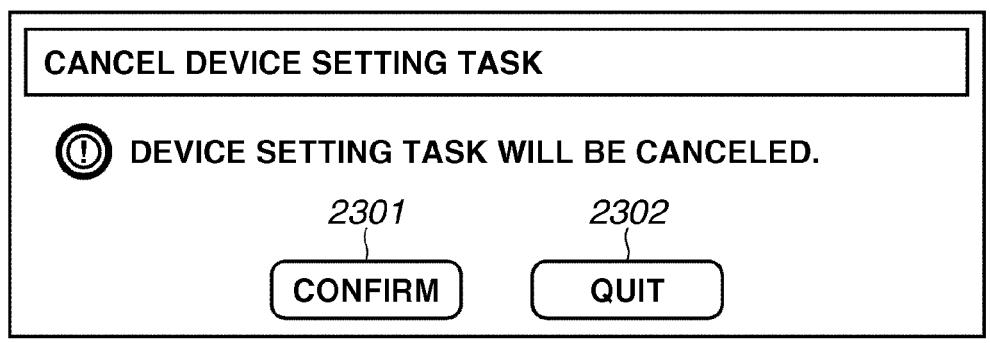
FIG. 23 is diagram schematically illustrating a device setting task cancel screen which the task control unit displays on a web browser running on the information processing apparatus via the network by using a servlet and from which the administrator can cancel a device setting task.

FIG. 23 is a diagram schematically illustrating a device setting task cancel screen which the task control unit 413 displays on a web browser running on the information processing apparatus 103 via the network 101 by using a servlet and from which the administrator can cancel a device setting task.

In FIG. 23, the device setting task cancel screen includes a confirm button 2301 for the cancellation of a device setting task, and a quit button 2302 for the cancellation of the device setting task.

Receiving a request to cancel a device setting task from the information processing apparatus 103, the task control unit 413 generates and transmits the device setting task cancel screen (FIG. 23) to the information processing apparatus 103.

A web browser is running on the information processing apparatus 103. The information processing apparatus 103 displays the device setting task cancel screen (FIG. 23) on the web browser. When the administrator makes a pressing operation on the confirm button 2301 or the quit button 2302, the information processing apparatus 103 transmits operation information to the task control unit 413.

The task control unit 413 receives the operation information transmitted from the information processing apparatus 103, and examines the operation information. If the operation information indicates a pressing operation on the confirm button 2301, the task control unit 413 cancels the device setting task. On the other hand, if the operation information indicates a pressing operation on the quit button 2302, the task control unit 413 will not cancel the device setting task.

Next, device setting task processing [1] according to the fifth exemplary embodiment will be described with reference to FIG. 26A. Device setting task processing [3] according to the fifth exemplary embodiment will be described with reference to FIG. 26B. The rest of the task processing of the task control unit 413 is similar to that of any of the first to fourth exemplary embodiments. A description thereof is omitted.

Figure 26A:
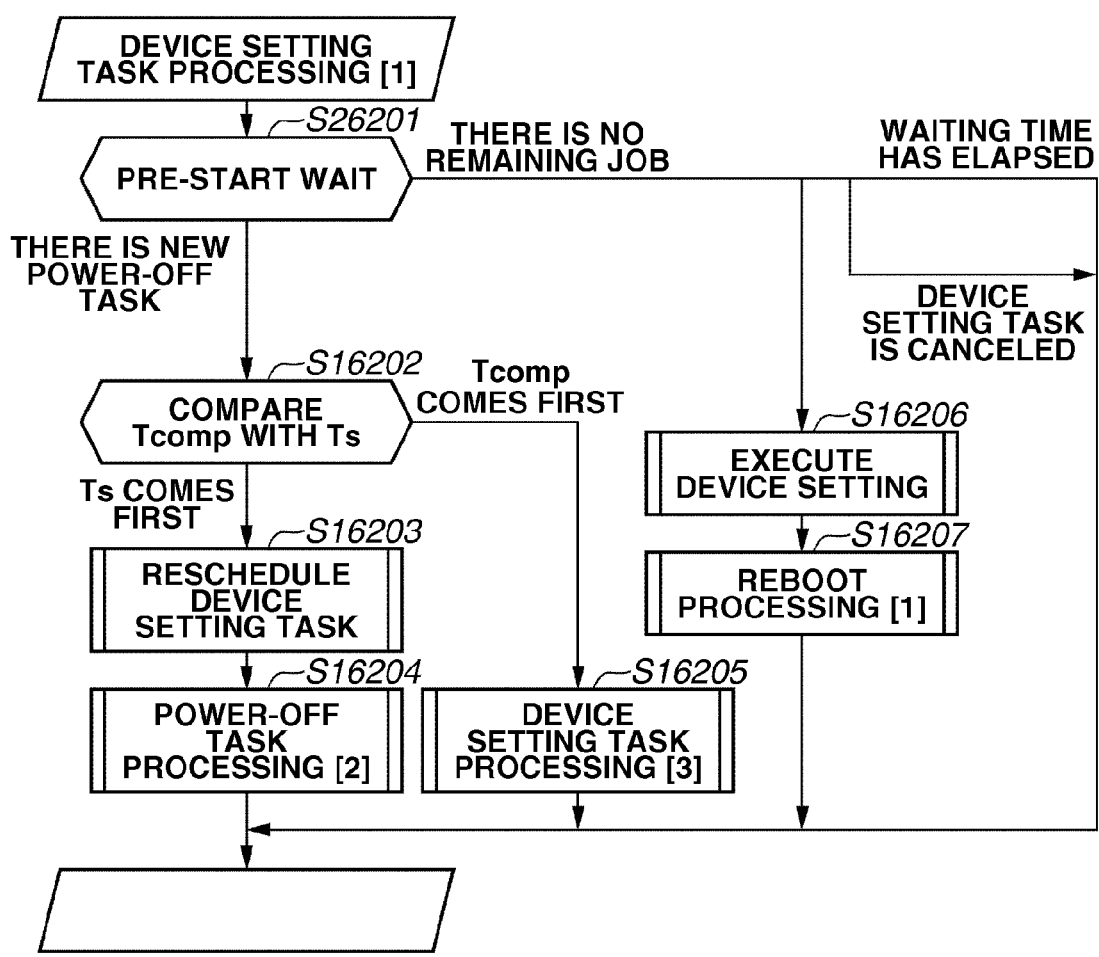
FIG. 26A is a flowchart illustrating device setting task processing [1] of the task control unit according to the fifth exemplary embodiment.

FIG. 26A is a flowchart illustrating the device setting task processing [1] of the task control unit 413 according to the fifth exemplary embodiment. The processing of this flowchart is implemented by the CPU inside the controller 202 executing a program stored in the internal ROM. Similar steps to those of FIG. 16C are designated by the same stem numbers. The following description deals only with differences from FIG. 16C.

In step S26201 of the device setting task processing [1] according to the fifth exemplary embodiment, the task control unit 413 initially performs a pre-start wait. In this step, the task control unit 413 waits until time has elapsed as much as the setting processing pre-start job wait maximum waiting time 707 of the device setting task currently in process, until there becomes no remaining job in the meantime, until a new power-off task is issued in the meantime, or until the device setting task is canceled in the meantime.

If a new power-off task is determined to be issued during the pre-start wait in step S26201 ("THERE IS NEW POWER-OFF TASK" in step S26201), the task control unit 413 advances the processing to step S16202. The processing in steps S16202 to S16205 is similar to that in FIG. 16C. A description thereof is omitted.

If there is determined to be no remaining job during the pre-start wait in step S26201 ("THERE IS NO REMAINING JOB" in step S26201), the task control unit 413 advances the processing to step S16206. The processing in steps S16206 and S16207 is similar to that in FIG. 16C. A description thereof is omitted.

If the setting processing pre-start job wait maximum waiting time 707 is determined to have elapsed during the pre-start wait in step S26201 ("WAITING TIME HAS ELAPSED" in step S26201), the task control unit 413 simply exits from the device setting task processing [1] and advances the processing to the next step according to the processing procedure of the calling source.

If the device setting task is determined to be canceled during the pre-start wait in step S26201 ("DEVICE SETTING TASK IS CANCELED" in step S26201), the task control unit 413 simply exits from the device setting task processing [1] and advances the processing to the next step according to the processing procedure of the calling source.

Figure 26B:
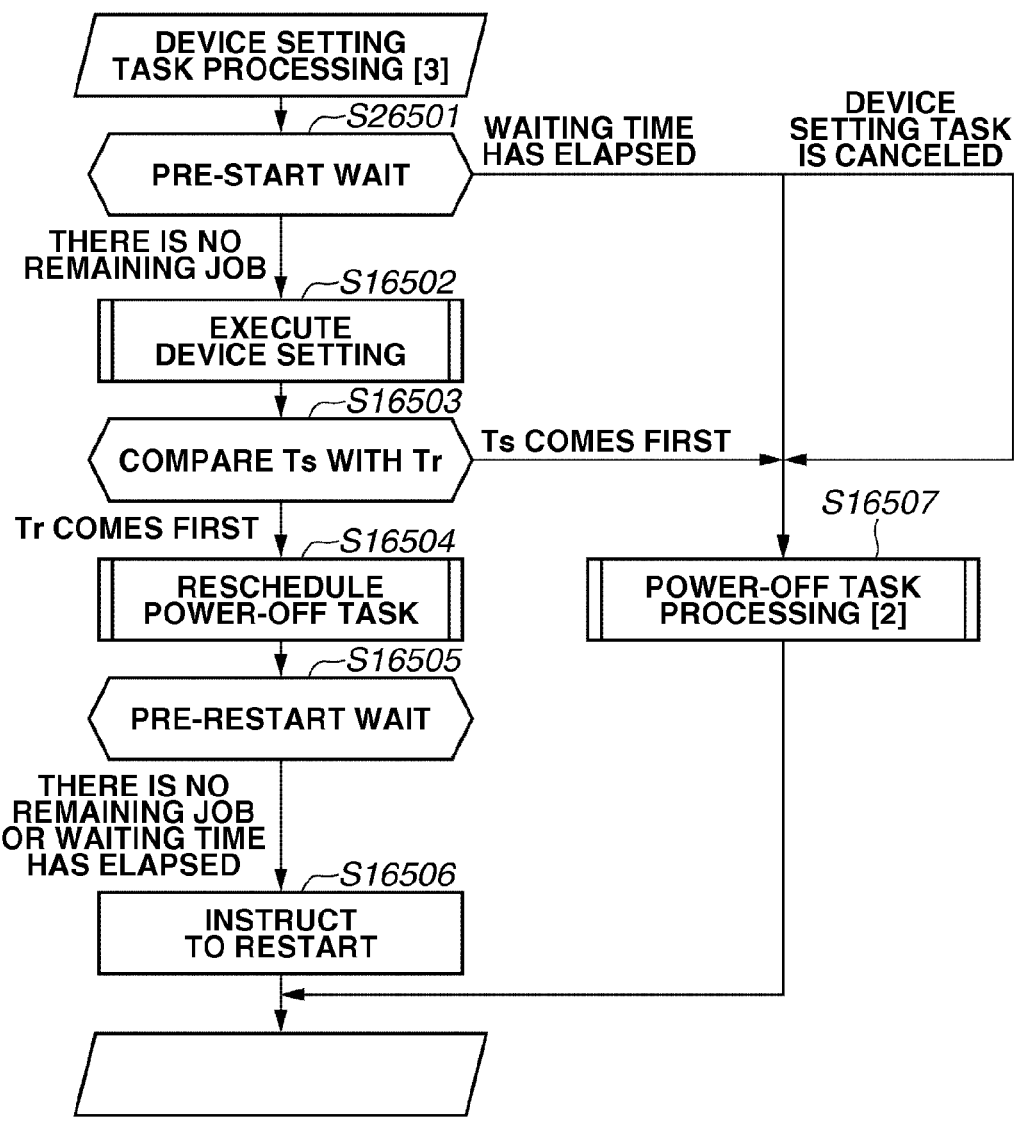
FIG. 26B is a flowchart illustrating device setting task processing [3] of the task control unit according to the fifth exemplary embodiment.

FIG. 26B is a flowchart illustrating the device setting task processing [3] of the task control unit 413 according to the fifth exemplary embodiment. The processing of this flowchart is implemented by the CPU inside the controller 202 executing a program stored in the internal ROM. Similar steps to those of FIG. 16F are designated by the same step numbers. The following description deals only with differences from FIG. 16F.

In step S26501 in the device setting task processing [3] according to the fifth exemplary embodiment, the task control unit 413 initially performs a pre-start wait. In this step, the task control unit 413 waits until the setting processing pre-start job wait maximum waiting time 707 of the device setting task in process has elapsed, until there becomes no remaining job in the meantime, or until the device setting task is canceled in the meantime.

If there is determined to be no remaining job during the pre-start wait in step S26501 ("THERE IS NO REMAINING JOB" in step S26501), the task control unit 413 advances the processing to step S16502. The processing in steps S16502 to S16506 is similar to that in FIG. 16F. A description thereof is omitted.

If the setting processing pre-start job wait maximum waiting time 707 is determined to have elapsed during the pre-start wait in step S26501 ("WAITING TIME HAS ELAPSED" in step S26501), the task control unit 413 advances the processing to step S16507.

If the device setting task is determined to be canceled during the pre-start wait in step S26501 ("DEVICE SETTING TASK IS CANCELED" in step S26501), the task control unit 413 advances the processing to step S16507.

The processing in step S16507 is similar to that in FIG. 16F. A description thereof is omitted.

As has been described above, according to the fifth exemplary embodiment, if a device setting task already exists, the administrator is not allowed to generate a power-off task that may cause a power-off while the device setting value acquisition module 432 or the device setting execution module 433 is acquiring a device setting value or executing setting. More specifically, the power-off task providing unit 414 inhibits designation of a power-off task such that the end of the designated period of the power-off task to be designated is included in a period between the beginning of the designated period of the designated device setting task and a date and time when the setting process is estimated to be completed. This can inform the administrator of the danger that a power-off may be scheduled for a period when the acquisition of a device setting value and the execution of device setting are in process.

In the foregoing fifth exemplary embodiment, the administrator can freely set a device setting task. If a power-off task is already set, the administrator can thus set a device setting task that may conflict with the power-off task.

A sixth exemplary embodiment provides a configuration that imposes a constraint condition so that if there is a power-off task, a device setting task that may conflict with the power-off task is not able to be generated.

The sixth exemplary embodiment will be described below only in terms of differences from the fifth exemplary embodiment. Omitted details are similar to those of the fifth exemplary embodiment.

Device setting task generation processing according to the sixth exemplary embodiment will initially be described with reference to the flowchart of FIG. 28.

FIG. 28 is a flowchart illustrating an example of a procedure by which the device setting task generation module 431 according to the sixth exemplary embodiment generates a device setting task. The processing of this flowchart is implemented by the CPU inside the controller 202 executing a program stored in the internal ROM. Similar steps to those of FIG. 13 are designated by the same step numbers. The following description deals only with differences from FIG. 13.

The device setting task generation module 431 according to the sixth exemplary embodiment initially receives a request to generate a device setting task from the information processing apparatus 103. In step S2801, the device setting task generation module 431 starts the processing.

In step S2802, the device setting task generation module 431 checks whether there is power-off task data.

If there is determined to be power-off task data (YES in step S2802), the device setting task generation module 431 advances the processing to step S2803.

In step S2803, the device setting task generation module 431 calculates a constraint condition on a device setting task. The device setting task generation module 431 calculates the constraint condition so that an execution time and waiting time cannot be set to call the device setting value acquisition module 432 or the device setting execution module 433 in a time range where a power-off may occur, i.e., between the start time 502 and the final execution time Ts of the power-off task. The device setting task generation module 431 then advances the processing to step S1302.

If, in step S2802, there is determined to be no power-off task data (NO in step S2802), the device setting task generation module 431 advances the processing to step S1302.

In step S2804, the device setting task generation module 431 performs data consistency check processing. Here, the device setting task generation module 431 verifies data consistency like step S1307 of FIG. 10. The device setting task generation module 431 also determines data to be inconsistent if the data is operable to generate a device setting task that interferes with the foregoing constraint condition. The rest of the processing is similar to that illustrated in FIG. 13. A description thereof is omitted.

Next, a device setting task generation screen according to the sixth exemplary embodiment will be described with reference to FIG. 27.

FIG. 27 is a diagram schematically illustrating the device setting task generation screen, which the device setting task generation module 431 according to the sixth exemplary embodiment displays on a web browser running on the information processing apparatus 103 via the network 101 by using a servlet and from which the administrator can generate a device setting task. Similar items to those of FIG. 8 are designate by the same reference numerals. The follow description deals only with differences from FIG. 8.

In FIG. 27, the device setting task generation screen includes a message 2701 to be presented to the administrator about the foregoing constraint condition. The message 2701 will not be displayed if there is no power-off task. Without a power-off task, the device setting task generation screen is the same as that illustrated in FIG. 8.

As has been described above, according to the sixth exemplary embodiment, if a power-off task already exists, the administrator is not allowed to generate a device setting task that may acquire a device setting value or execute setting at a time when a power-off may be executed. More specifically, the device setting task providing unit 415 inhibits designation of a device setting task such that the end of the designated period of the designated power-off task is not included in a period between the beginning of the designated period the device setting task to be designated and a date and time when the setting process is estimated to be completed. This can inform the administrator of the danger that the acquisition of a device setting value or the execution of device setting may be scheduled for a period when a power-off is in process.

As has been described above, according to the exemplary embodiments of the present invention, device setting and a power-off can be properly performed even if the device setting, an accompanying restart, and the power-off are instructed to be executed immediately or according to a schedule in an overlapping manner.

In particular, a power-off is prevented from being left undone at a time when the power-off is supposed to have surely been performed. This can prevent a failure of the device (the MFP 102) from occurring even if the power supply is disconnected from outside.

The configurations and contents of the various types of data are not limited to the foregoing. Various configurations and contents may be included depending on applications and purposes.

While the exemplary embodiments have been described above, an exemplary embodiment of the present invention may be practiced, for example, as a system, apparatus, method, program, and/or storage medium. Specifically, an exemplary embodiment of the present invention can be applied to a system including a plurality of devices, or can be applied to an apparatus including a single device.

Configurations including combinations of the foregoing exemplary embodiments are all intended to be embraced in exemplary embodiments of the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-031392 filed Feb. 16, 2012, which is hereby incorporated by reference herein in its entirety.

What is claimed is:

1. An image forming apparatus comprising:
   a first designation unit configured to designate a power-off task of shutting down the image forming apparatus in a designated period;
   a second designation unit configured to designate a setting task of executing a setting process for setting a setting item of the image forming apparatus in a designated period and a restart process for restarting the image forming apparatus after the setting process; and
   a task control unit configured to control execution of the designated power-off task and the designated setting task,
   wherein the task control unit is configured to, if the power-off task is designated, perform control to change processing of the power-off task and the setting task according to whether an end of the designated period of the power-off task reaches a period corresponding to the setting process of the setting task or a period corresponding to the restart process of the setting task, and
   wherein the task control unit is configured to, if the end of the designated period of the power-off task is included in a period between a date and time when the setting process of the setting task is estimated to be completed and a date and time when the image forming apparatus is estimated to be completely restarted by the restart process of the setting task, perform control to execute the setting process of the setting task, cancel the restart process of the setting task, and execute the power-off task.

2. The image forming apparatus according to claim 1, wherein the task control unit is configured to, if the end of the designated period of the power-off task is included in a period between a beginning of the designated period of the setting task and a date and time when the setting process is estimated to be completed, perform control to once cancel the setting task, reschedule the setting task so that the setting task is to be executed at next startup time of the image forming apparatus, and execute the power-off task.

3. The image forming apparatus according to claim 2, wherein the task control unit is configured to, if the end of the designated period of the power-off task is included in the period between the beginning of the designated period of the setting task and the date and time when the setting process is estimated to be completed and a beginning of the designated period of the power-off task comes before the date and time when the setting process of the setting task is estimated to be completed, perform control to reschedule the power-off task so that the power-off task is to be executed immediately after the setting process of the setting task, and execute the setting process of the setting task.

4. The image forming apparatus according to claim 1, wherein the task control unit is configured to, if the end of the designated period of the power-off task comes after a date and time when the image forming apparatus is estimated to be completely restarted by the restart process of the setting task, perform control to execute the setting process of the setting task, once cancel the power-off task, reschedule the power-off task so that the power-off task is to be executed at next startup time of the image forming apparatus, and execute the restart process of the setting task.

5. The image forming apparatus according to claim 1, further comprising a notification unit configured to make a notification to a predetermined user in a case where the power-off task is not executed even though the restart process of the setting task is canceled by the task control unit.

6. The image forming apparatus according to claim 5, wherein the notification is to prompt the predetermined user to manually restart the image forming apparatus.

7. The image forming apparatus according to claim 5, further comprising a cancel unit configured to cancel the power-off task according to an instruction from the predetermined user,
   wherein the case where the power-off task is not executed includes a case where the power-off task is canceled by the cancel unit.

8. The image forming apparatus according to claim 5, wherein the first designation unit is configured to make designation including presence or absence of a forced execution instruction to execute the power-off task even if execution of a waited job does not end within the designated period, and
   wherein the case where the power-off task is not executed includes a case where the forced execution instruction is not given for the power-off task and the execution of a waited job does not end within the designated period of the power-off task.

9. The image forming apparatus according to claim 1, wherein the task control unit is configured to restart the image forming apparatus in a case where the power-off task is not executed even though the restart process of the setting task is canceled.

10. The image forming apparatus according to claim 1, wherein the first designation unit is configured to inhibit designation of the power-off task such that the end of the designated period of the power-off task to be designated is included in a period between a beginning of the designated setting task and a date and time when the setting process is estimated to be completed.

11. The image forming apparatus according to claim 1, wherein the second designation unit is configured to inhibit designation of the setting task such that the end of the designated period of the designated power-off task is not included in a period between a beginning of the designated period of the setting task to be designated and a date and time when the setting process is estimated to be completed.

12. A method for controlling an image forming apparatus, the method comprising:

designating a power-off task of shutting down the image forming apparatus in a designated period;
   designating a setting task of executing a setting process for setting a setting item of the image forming apparatus in a designated period and a restart process for restarting the image forming apparatus after the setting process;
   controlling execution of the designated power-off task and the designated setting task; and
   performing, if the power-off task is designated, control to change processing of the power-off task and the setting task according to whether an end of the designated period of the power-off task reaches a period corresponding to the setting process of the setting task or a period corresponding to the restart process of the setting task, and
   wherein, if the end of the designated period of the power-off task is included in a period between a date and time when the setting process of the setting task is estimated to be completed and a date and time when the image forming apparatus is estimated to be completely restarted by the restart process of the setting task, performing control to execute the setting process of the setting task, cancel the restart process of the setting task, and execute the power-off task.

13. A non-transitory computer-readable storage medium storing a computer program that causes a computer to execute a method for controlling an image forming apparatus, the method comprising:

designating a power-off task of shutting down the image forming apparatus in a designated period;
   designating a setting task of executing a setting process for setting a setting item of the image forming apparatus in a designated period and a restart process for restarting the image forming apparatus after the setting process;
   controlling execution of the designated power-off task and the designated setting task; and
   performing, if the power-off task is designated, control to change processing of the power-off task and the setting task according to whether an end of the designated period of the power-off task reaches a period corresponding to the setting process of the setting task or a period corresponding to the restart process of the setting task, and
   wherein, if the end of the designated period of the power-off task is included in a period between a date and time when the setting process of the setting task is estimated to be completed and a date and time when the image forming apparatus is estimated to be completely restarted by the restart process of the setting task, performing control to execute the setting process of the setting task, cancel the restart process of the setting task, and execute the power-off task.

* * * * *